(12) United States Patent
Hicks, III

(10) Patent No.: US 8,055,248 B2
(45) Date of Patent: Nov. 8, 2011

(54) SYSTEM AND METHOD FOR PROVIDING INTEGRATED VOICE AND DATA SERVICES UTILIZING WIRED CORDLESS ACCESS WITH UNLICENSED SPECTRUM AND WIRED ACCESS WITH LICENSED SPECTRUM

(75) Inventor: John A. Hicks, III, Roswell, GA (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 0 days.

(21) Appl. No.: 12/730,827

(22) Filed: Mar. 24, 2010

(65) Prior Publication Data
US 2010/0173620 A1    Jul. 8, 2010

Related U.S. Application Data

(63) Continuation of application No. 11/234,951, filed on Sep. 26, 2005, which is a continuation-in-part of application No. 11/041,604, filed on Jan. 24, 2005, now Pat. No. 7,627,338, which is a continuation-in-part of application No. 10/614,744, filed on Jul. 7, 2003, now Pat. No. 7,610,047.

(60) Provisional application No. 60/607,920, filed on Sep. 8, 2004, provisional application No. 60/476,743, filed on Jun. 6, 2003, provisional application No. 60/495,843, filed on Jun. 23, 2003.

(51) Int. Cl.
*H04M 3/42* (2006.01)

(52) U.S. Cl. ......... 455/417; 455/415; 455/463; 455/464

(58) Field of Classification Search .................. 455/415, 455/417, 463
See application file for complete search history.

(56) References Cited

U.S. PATENT DOCUMENTS

| | | | |
|---|---|---|---|
| 5,127,042 A | 6/1992 | Gillig et al. | |
| 5,454,032 A | 9/1995 | Pinard et al. | |
| 5,594,782 A * | 1/1997 | Zicker et al. | 455/417 |
| 5,875,404 A | 2/1999 | Messiet | |

(Continued)

FOREIGN PATENT DOCUMENTS
WO    9731434    8/1997

OTHER PUBLICATIONS

Final OA dated Jan. 30, 2006 cited in U.S. Appl. No. 10/614,744.

(Continued)

*Primary Examiner* — Charles Appiah
*Assistant Examiner* — Randy Peaches
(74) *Attorney, Agent, or Firm* — Turocy & Watson, LLP

(57) ABSTRACT

Systems and methods for providing integrated wireless and wired data voice and data services via a dual mode telecommunications device are provided. A communication directed to an address associated with a dual mode device is received. If the dual mode device is in range of a wireless access point connected to a wired data network, then a determination is made whether the address of the dual mode device is associated with an address of at least one other device associated with the wired data network. If the address of the dual mode device is associated with an address of at least one other device associated with the wired data network, then the communication is routed over the wired data network to the dual mode device and the at least one other device.

20 Claims, 18 Drawing Sheets

U.S. PATENT DOCUMENTS

| | | | |
|---|---|---|---|
| 5,915,220 | A | 6/1999 | Chelliah |
| 5,915,224 | A | 6/1999 | Jonsson |
| 5,963,864 | A | 10/1999 | O'Neil et al. |
| 6,044,267 | A | 3/2000 | Foladare et al. |
| 6,081,726 | A | 6/2000 | Baek |
| 6,097,804 | A | 8/2000 | Gilbert et al. |
| 6,141,556 | A | 10/2000 | Dougherty |
| 6,259,782 | B1 | 7/2001 | Gallant |
| 6,363,246 | B1 | 3/2002 | Williams et al. |
| 6,373,817 | B1 | 4/2002 | Kung et al. |
| 6,393,484 | B1 | 5/2002 | Massarani |
| 6,404,764 | B1 | 6/2002 | Jones |
| 6,434,394 | B1 | 8/2002 | Grundvig |
| 6,449,483 | B1 | 9/2002 | Akhteruzzaman |
| 6,611,692 | B2 | 8/2003 | Raffel et al. |
| 6,681,118 | B2 | 1/2004 | Raffel et al. |
| 6,704,580 | B1 | 3/2004 | Fintel |
| 6,763,226 | B1 | 7/2004 | McZeal |
| 6,766,160 | B1 | 7/2004 | Lemilainen |
| 6,792,095 | B1 | 9/2004 | Frank |
| 6,826,174 | B1 | 11/2004 | Erekson |
| 6,829,477 | B1 | 12/2004 | Lu et al. |
| 6,829,481 | B2 | 12/2004 | Souissi |
| 6,853,851 | B1 | 2/2005 | Rautiola et al. |
| 6,865,372 | B2 | 3/2005 | Mauney et al. |
| 6,868,072 | B1 | 3/2005 | Lin |
| 6,876,852 | B1 | 4/2005 | Li et al. |
| 6,922,559 | B2 | 7/2005 | Mohammed |
| 6,950,674 | B2 | 9/2005 | Jarrett |
| 6,970,474 | B1 | 11/2005 | Sinha |
| 6,978,003 | B1 | 12/2005 | Sylvain |
| 7,039,027 | B2 | 5/2006 | Bridgelall |
| 7,107,620 | B2 | 9/2006 | Haverinen |
| 7,127,239 | B2 * | 10/2006 | Ogman et al. .......... 455/417 |
| 7,200,112 | B2 | 4/2007 | Sundar et al. |
| 7,215,959 | B2 | 5/2007 | Creamer et al. |
| 7,257,205 | B2 * | 8/2007 | Forte .......... 379/112.02 |
| 7,277,724 | B2 | 10/2007 | Jones et al. |
| 7,359,371 | B2 | 4/2008 | Emley et al. |
| 7,369,856 | B2 | 5/2008 | Ovadia |
| 7,406,324 | B1 | 7/2008 | McConnell |
| 7,466,991 | B2 | 12/2008 | Everson et al. |
| 7,502,615 | B2 | 3/2009 | Wilhoite et al. |
| 7,610,047 | B2 | 10/2009 | Hicks, III et al. |
| 7,627,338 | B2 | 12/2009 | Hicks, III et al. |
| 7,646,777 | B2 | 1/2010 | Hicks, III et al. |
| 7,657,270 | B2 | 2/2010 | Hicks, III et al. |
| 2002/0024937 | A1 | 2/2002 | Barnard et al. |
| 2002/0072390 | A1 | 6/2002 | Uchiyama |
| 2002/0116464 | A1 | 8/2002 | Mak |
| 2002/0137500 | A1 | 9/2002 | Brooking |
| 2002/0141390 | A1 | 10/2002 | Fangman et al. |
| 2002/0147008 | A1 | 10/2002 | Kallio |
| 2002/0157007 | A1 | 10/2002 | Sashihara |
| 2003/0039242 | A1 | 2/2003 | Moore |
| 2003/0115261 | A1 | 6/2003 | Mohammed |
| 2003/0134658 | A1 | 7/2003 | Kaminski |
| 2003/0139180 | A1 | 7/2003 | McIntosh |
| 2003/0157929 | A1 | 8/2003 | Janssen et al. |
| 2003/0186676 | A1 | 10/2003 | Ogman et al. |
| 2004/0017901 | A1 | 1/2004 | Lim |
| 2004/0030791 | A1 | 2/2004 | Dorenbosch |
| 2004/0072593 | A1 | 4/2004 | Robbins |
| 2004/0114603 | A1 | 6/2004 | Suhail |
| 2004/0132500 | A1 | 7/2004 | Rogalski et al. |
| 2004/0141484 | A1 | 7/2004 | Rogalski |
| 2004/0146021 | A1 | 7/2004 | Fors et al. |
| 2004/0162092 | A1 | 8/2004 | Marsico et al. |
| 2004/0203788 | A1 | 10/2004 | Fors et al. |
| 2004/0219948 | A1 | 11/2004 | Jones |
| 2004/0229634 | A1 | 11/2004 | Bushnell |
| 2005/0070272 | A1 | 3/2005 | Marangos |
| 2005/0190789 | A1 | 9/2005 | Salkini et al. |
| 2005/0286501 | A1 | 12/2005 | Higuchi |
| 2007/0083470 | A1 | 4/2007 | Bonner et al. |
| 2007/0153736 | A1 | 7/2007 | Mow et al. |
| 2008/0026775 | A1 | 1/2008 | Arazi et al. |

OTHER PUBLICATIONS

Final OA dated Oct. 17, 2005 cited in U.S. Appl. No. 10/614,751.
Final OA dated Dec. 27, 2006 cited in U.S. Appl. No. 10/614,751.
Final OA dated Feb. 3, 2009 cited in U.S. Appl. No. 10/614,751.
Final OA dated Mar. 17, 2009 cited in U.S. Appl. No. 10/614,737.
Final OA dated Mar. 31, 2008 cited in U.S. Appl. No. 10/614,737.
Final OA dated May 15, 2007 cited in U.S. Appl. No. 10/614,744.
Final OA dated Jun. 16, 2008 cited in U.S. Appl. No. 10/614,744.
Final OA dated Jun. 19, 2009 for U.S. Appl. No. 11/234,951, 21 pages.
Final OA dated Jul. 21, 2008 cited in U.S. Appl. No. 10/614,751.
OA dated Jan. 11, 2008 cited in U.S. Appl. No. 11/041,604.
OA dated Jan. 18, 2008 cited in U.S. Appl. No. 10/614,751.
OA dated Jan. 29, 2009 cited in U.S. Appl. No. 11/041,604.
OA dated Oct. 10, 2007 in U.S. Appl. No. 11/234,951.
OA dated Oct. 2, 2006 cited in U.S. Appl. No. 10/614,744.
OA dated Oct. 30, 2007 cited in U.S. Appl. No. 10/614,744.
OA dated Dec. 10, 2008 cited in U.S. Appl. No. 11/234,951.
U.S. Appl. No. 11/513,720, filed Aug. 31, 2006 entitled "Communication Environment Switchover".
OA dated Mar. 14, 2008 cited in U.S. Appl. No. 11/234,951.
OA dated Mar. 25, 2009 for U.S. Appl. No. 11/513,720, 28 pages.
OA dated Mar. 6, 2008 cited in U.S. Appl. No. 11/234,951.
OA dated Apr. 20, 2006 cited in U.S. Appl. No. 10/614,751.
OA dated Apr. 22, 2005 cited in U.S. Appl. No. 10/614,751.
OA dated May 2, 2007 cited in U.S. Appl. No. 10/614,751.
OA dated May 4, 2005 for U.S. Appl. No. 10/614,744.
OA dated Jul. 11, 2008 cited in U.S. Appl. No. 11/041,604.
OA dated Sep. 27, 2007 cited in U.S. Appl. No. 10/614,737.
OA dated Sep. 5, 2008 cited in U.S. Appl. No. 10/614,737.
OA dated Jan. 22, 2009 cited in U.S. Appl. No. 10/614,744.
U.S. Appl. No. 10/614,737, filed Jul. 7, 2003 entitlted System and Method for Providing Integrated Voice and a Data Services Utilizing Wired Cordless Access with Unlicensed / Unregulated Spectrum.
U.S. Appl. No. 10/614,744, filed Jul. 7, 2003 entitled System and Method for Providing Integrated Voice and Data Services Ulitizing Wired Cordless Access with Unlicensed / Unrelgulated Spectrum and Wired Access with Licensed / Regulated Spectrum.
U.S. Appl. No. 10/614,751, filed Jul. 7, 2003 entitled "System and Method for Providing a Single Telephone Number for Use with a Plurality of Telephone Handsets".
U.S. Appl. No. 11/041,604, filed Jan. 24, 2005 entitled "System and Method for Providing Integrated Voice and Data Services Utilizing Wired Cordless Access with Unlicensed Spectrum and Wired Access with Licensed Spectrum".
U.S. Appl. No. 11/234,951, filed Sep. 26, 2005 entitled "System and Method for Providing Integrated Voice and Data Services Utilizing Wired Cordless Access with Unilicensed Spectrum and Wired Access with Licensed Spectrum".
OA dated Apr. 1, 2010 for U.S. Appl. No. 12/616,736, 48 pages.
OA dated Dec. 10, 2009 for U.S. Appl. No. 10/614,737, 48 pages.
OA dated Jun. 8, 2010 for U.S. Appl. No. 10/614,737, 34 pages.
OA dated Sep. 13, 2010 for U.S. Appl. No. 12/616,736, 27 pages.
OA dated Dec. 15, 2010 for U.S. Appl. No. 12/626,167, 36 pages.
OA dated Oct. 26, 2010 for U.S. Appl. No. 10/614,737, 42 pages.
OA dated Jun. 25, 2010 for U.S. Appl. No. 12/614,781, 38 pages.
OA dated Dec. 23, 2010 for U.S. Appl. No. 12/614,781, 27 pages.

* cited by examiner

SYSTEM AND METHOD FOR PROVIDING INTEGRATED VOICE AND DATA SERVICES UTILIZING WIRED CORDLESS ACCESS WITH UNLICENSED SPECTRUM AND WIRED ACCESS WITH LICENSED SPECTRUM

CROSS REFERENCE TO RELATED APPLICATIONS

This application is a continuation of U.S. patent application Ser. No. 11/234,951, entitled "System and Method for Providing Integrated Voice and Data Services Utilizing Wired Cordless Access with Unlicensed Spectrum and Wired Access with Licensed Spectrum" filed on Sep. 26, 2005, which is a continuation-in-part of co-pending U.S. patent application Ser. No. 11/041,604, entitled "System and Method for Providing Integrated Voice and Data Services Utilizing Wired Cordless Access with Unlicensed Spectrum and Wired Access with Licensed Spectrum" filed on Jan. 24, 2005, which claims priority from U.S. provisional application No. 60/607,920 entitled "System and Method for Providing Integrated Voice and Data Services Utilizing Wired Cordless Access with Unlicensed/Unregulated Spectrum and Wired Access with Licensed/Regulated Spectrum" filed on Sep. 8, 2004, and which is a continuation-in-part of U.S. patent application Ser. No. 10/614,744, entitled "System and Method for Providing Integrated Voice and Data Services Utilizing Wired Cordless Access with Unlicensed/Unregulated Spectrum and Wired Access with Licensed/Regulated Spectrum," filed Jul. 7, 2003, Issued U.S. Pat. No. 7,610,047 Oct. 27, 2009, which claims priority from U.S. provisional application No. 60/476,743, entitled "System for Providing Integrated Voice and Data Services Utilizing Wired Cordless Access with Unlicensed Spectrum," filed Jun. 6, 2003 and U.S. provisional application No. 60/495,843, entitled "System for 25 Providing Integrated Voice and Data Services Utilizing Wired Cordless Access with Unlicensed/Unregulated Spectrum," filed Jun. 23, 2003. The entireties of each of the foregoing applications are incorporated herein by reference.

FIELD OF THE INVENTION

This invention relates to communications services via licensed and unlicensed connectivity sources. More particularly, this invention relates to a dual mode communications device that operates as a mobile wireless device via a licensed connectivity source and operates as a digital cordless device when in range of an unlicensed wireless connectivity source.

BACKGROUND OF THE INVENTION

The benefits of mobility have motivated a majority of the U.S. population to obtain cellular or other wireless mobile telephone services operated through licensed connectivity sources (licensed spectrum). One of the major reasons that a large portion of the population does not have wireless mobile telephone service is that they do not perceive a need for the service. In addition, wireless mobile service is viewed as being an expensive and somewhat complicated service from the perspective of billing plans. On the other hand, a very high percentage of households and businesses that do not have wireless mobile telephone service do have cordless telephones. Such cordless telephones typically include a base station wired to a local telephone service provider and one or more cordless telephone handsets. Accordingly, a user of such a cordless telephone may walk through the home or business utilizing the cordless telephone just as the user might use a mobile wireless telephone outside the home or business.

Telephone services users who do utilize mobile wireless telephones and wireline telephones typically have separate telephone directory numbers for each telephone. Accordingly, such users receive separate telephone services bills for their mobile wireless services and for their wireline services. In most cases, users also have different features and functions, such as voicemail services, associated with each different telephone. With the continued growth of mobile wireless telephone services usage, many users have begun to treat mobile wireless telephones as their primary telephone, but in many areas the quality of mobile wireless telephone service coverage is inadequate when users enter certain geographical areas or when they enter buildings, including homes and public buildings.

Accordingly, there is a need for a system and method for providing integrated voice and data services using wireline access over unlicensed connectivity sources and wireless access over licensed connectivity sources via a dual mode communications device. It is with respect to these and other considerations that the present invention has been made.

SUMMARY OF THE INVENTION

Embodiments of the present invention provide systems and methods for integrated wireless and wireline voice and data services via a dual mode communications device. According to one aspect of the present invention, a dual mode communications device operates as a digital cordless device of a wired data network in a structure equipped with a wireless access point to allow voice over Internet protocol (VoIP) communications and data over Internet protocol communications via the wired data network. The dual mode communications device also operates as a mobile wireless device when the dual mode communications device is moved outside the range of a wireless access point of a user's home or a business. That is, when the dual mode communications device is moved outside the range of a wireless access point, the device switches to a wireless mobile network without user action. A user may be able to use the dual mode communications device to roam into another service provider's wireless telecommunications systems and VoIP via wireless access point networks. Users may receive one monthly bill for both wireless and VoIP wireline services.

According to an embodiment of the method, a communication directed to an address associated with a dual mode device is received. If the dual mode device is in range of a wireless access point connected to a wired data network, then a determination is made whether the address of the dual mode device is associated with an address of at least one other device associated with the wired data network. If the address of the dual mode device is associated with an address of at least one other device associated with the wired data network, then the communication is routed over the wired data network to the dual mode device and the at least one other device. If the dual mode device is not in range of a wireless access point connected to the wired data network, then the communication is routed to the dual mode device over a licensed wireless network.

The method may further include providing an indication at the dual mode device and at the at least one other device that the communication is directed to the address associated with the dual mode device. The indication may include ringing the devices with a distinctive ring associated with the dual mode device.

In accordance with another embodiment of the present invention, a communication directed to an address of at least one device in connection with the wired data network is received. A determination is made whether the address of the at least one device is associated with an address of a dual mode device. If the address of the at least one device is associated with an address of a dual mode device and the dual mode device is in range of a wireless access point connected to the wired data network, then the communication is routed to the at least one device and the dual mode device. If the dual mode device is not in range of a wireless access point connected to the wired data network, then the communication is routed to the at least one device over the wired data network.

The method may further include providing an indication at the at least one device and at the dual mode device that the communication is directed to the address associated with the at one device. The indication may include ringing the devices with a distinctive ring associated with the at least one device.

DETAILED DESCRIPTION

Embodiments of the present invention are directed to systems and methods for providing integrated licensed and unlicensed voice and data services. In the following detailed description, references are made to the accompanying drawings that form a part hereof and in which are shown by way of illustration specific embodiments or examples. These embodiments may be combined, other embodiments may be utilized, and structural changes may be made without departing from the spirit or scope of the present invention. The following detailed description is, therefore, not to be taken in a limiting sense and the scope of the present invention is defined by the appended claims and their equivalents.

Figure 1:
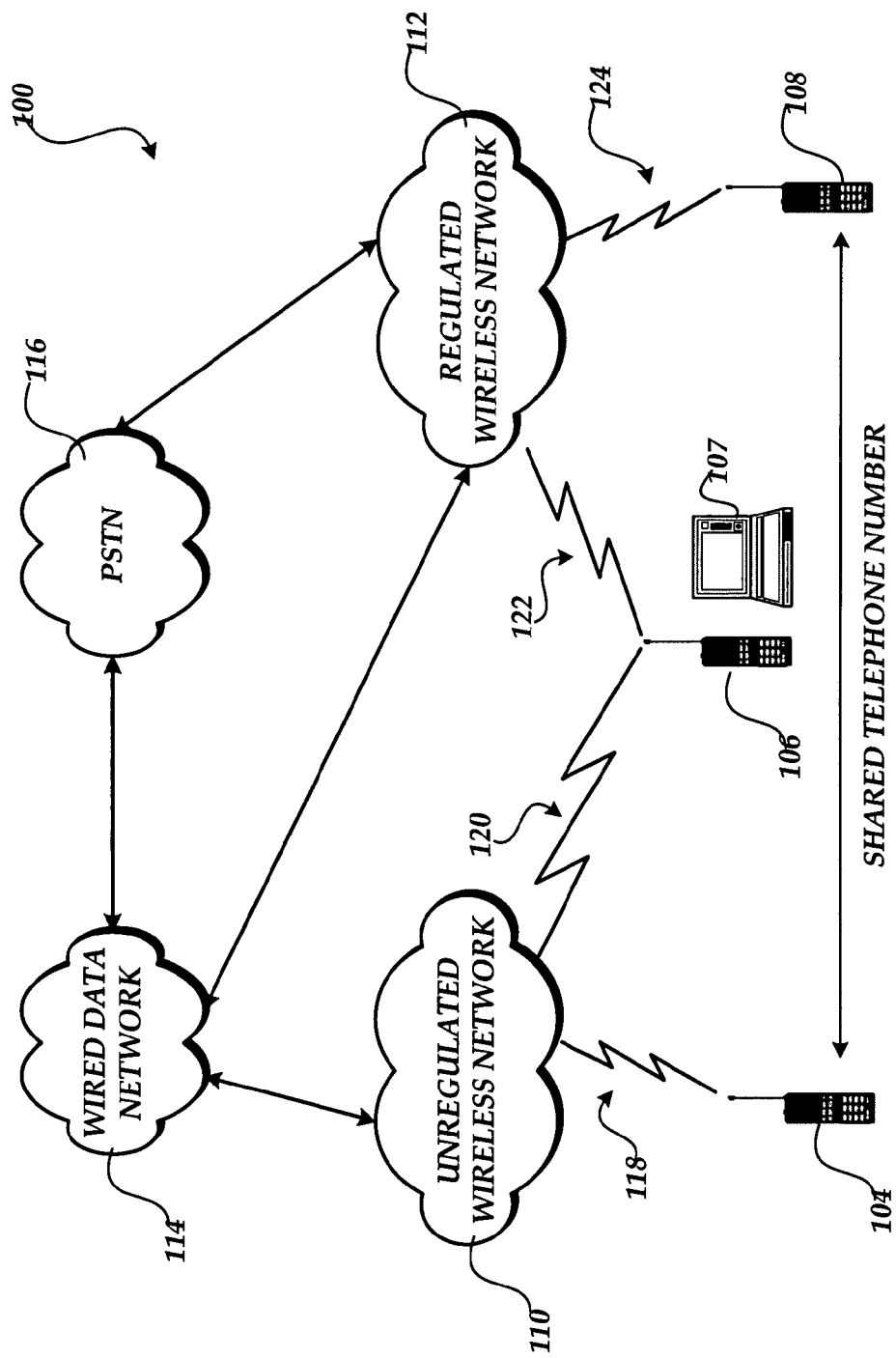
FIG. 1 is a simplified block diagram illustrating interaction between a wired data network, an unlicensed wireless network, a licensed wireless network, and a public switch telephone network, through which communications may be operated according to embodiments of the present invention.

Referring now to the drawings in which like numerals represent like elements through the several figures, aspects of the present invention and the exemplary operating environment will be described. FIG. 1 is a simplified block diagram illustrating interaction between a wired data network, an unlicensed wireless network, a licensed wireless network and a public switch telephone network, through which communications may be operated according to embodiments of the present invention. As described in further detail below, according to embodiments of the present invention, a digital cordless telephone or handset 104 is operative to communicate via an unlicensed wireless network 110 comprised of one or more locally or geographically disbursed wireless access points through which a user of the telephone 104 may communicate with voice and data services through VoIP via a wired data network 114. Communications from the telephone 104 through the wired data network 114 via VoIP may subsequently be communicated to other communications receivers through a public switch telephone network 116 or through a licensed wireless network 112, such as a typical cellular telephone communications system.

A telephone services provider may position wireless access points in homes, businesses, schools, leisure activity centers and the like. A user of the digital cordless telephone 104 may operate the telephone anytime the user is in range of the wireless access point of the unlicensed wireless network 110. Thus, the user may send and receive calls via the telephone 104 if the user is in her home, business, grocery store, school, and the like so long as her services provider has positioned wireless access points in those facilities through which the user may communicate VoIP communications through the wired data network 114 to other communication sources. As will be described in detail below, the user may also send and receive non-voice data services communications via the telephone 104 which may also comprise a computer implemented for data and voice communications, or other computing devices such as hand held computing devices, and personal digital assistants (PDA).

According to another embodiment of the present invention, a conventional wireless telephone handset 108 is provided for communications via wireless signaling 124 to a licensed wireless network 112. Communications through the licensed wireless network 112, such as a conventional cellular telephone network, may be passed through the public switch telephone network 116, a wired data network 114 and through to a user of the aforementioned digital cordless telephone 104 through the unlicensed wireless network 110. According to an embodiment of the present invention, a single shared telephone number may be assigned to both the digital cordless telephone 104 and the conventional wireless telephone 108. Telephone calls placed to the single assigned telephone directory number ring both the digital cordless telephone 104 and the conventional wireless telephone 108 so that the user of both telephones may be reached by either telephone without the need for separate telephone directory numbers and separate billing invoices.

According to another embodiment of the present invention, a dual mode telephone 106 is provided for operating through both the unlicensed wireless network via wireless access points, described above, and for operating via a licensed wireless network 112, as described above. When the telephone handset 106 is moved into range of one or more wireless access points to allow the telephone to communicate over the unlicensed wireless network 110, the telephone 106 transitions into the mode previously described for the digital cordless telephone 104. On the other hand, when the telephone 106 is moved out of range of one or more wireless access points for communication through the unlicensed wireless network 110, the telephone 106 automatically transitions into a licensed wireless mode for communication through the licensed wireless network 112, as described above for the telephone 108. Advantageously, a single telephone 106 may be utilized for both licensed wireless communications and unlicensed wireless communications through a wired data network 114.

For purposes of the description that follows, communication to and from any wireline or wireless telephones 104, 106, 108, 308 includes, but is not limited to, telephone devices that may communicate via a variety of connectivity sources, including wireline, wireless, voice and data over Internet protocol, wireless fidelity (WiFi), ultra wide band communications and satellite communications. A computer 107 is illustrated for digital data services via the unlicensed wireless network 110 through the wired data network 114, as described above. The computer 107 is also illustrative of other mobile digital devices (hereafter MDD) such as personal digital assistants (PDA), instant messaging devices, voice and data over Internet protocol devices, communication watches or any device allowing digital and/or analog communication over a variety of connectivity means described herein.

Figure 2:
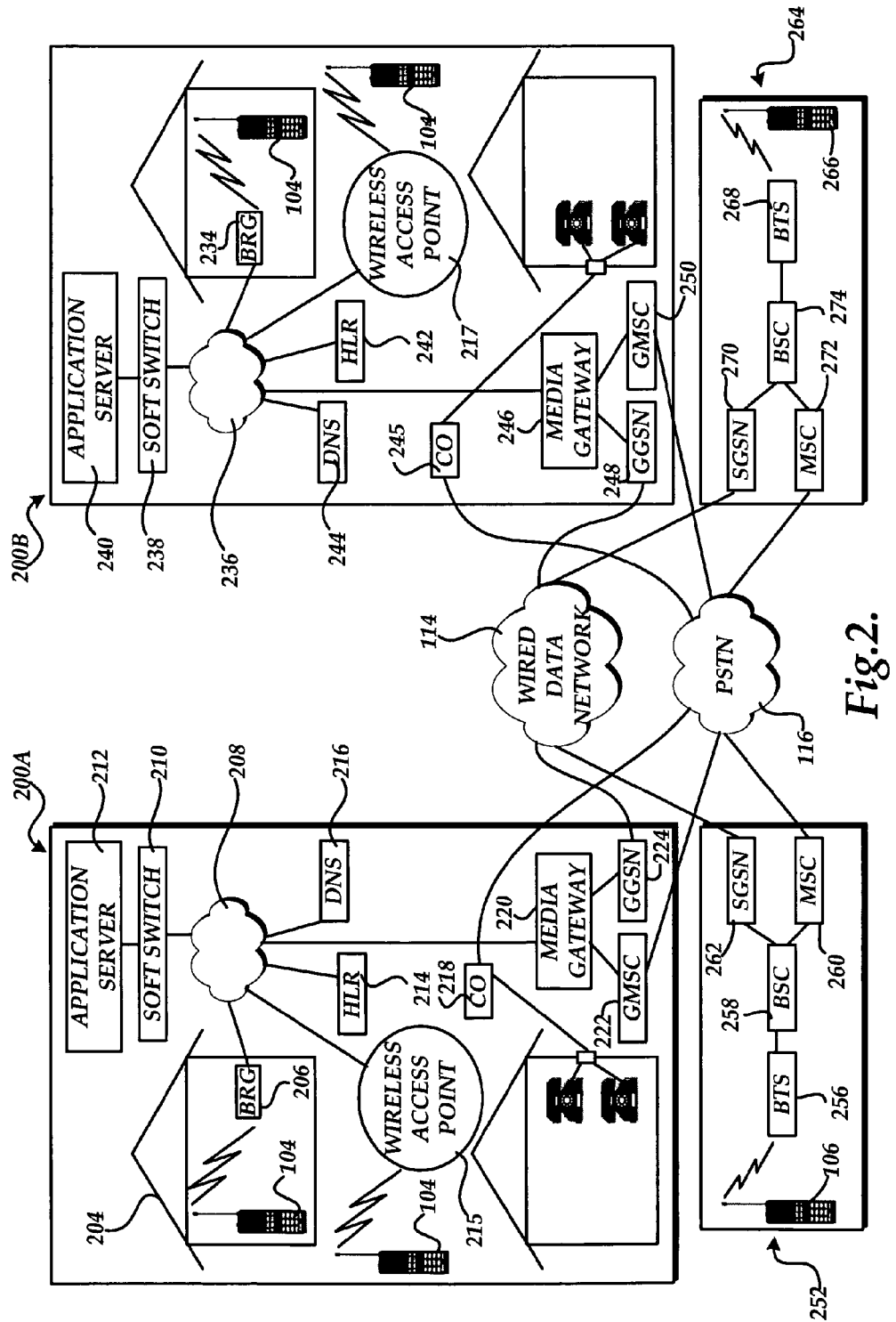
FIG. 2 is a block diagram showing a communications service architecture for communicating via a VoIP and wireline telecommunications according to embodiments of the present invention.

FIG. 2 is a block diagram showing a communications service architecture for communicating via a voice over Internet protocol and wireline telecommunications according to embodiments of the present invention. A first architecture 200A is provided for a first service provider while a second architecture 200B that mirrors the first service provider is provided for a second service provider. A digital cordless phone 104 and a dual mode telephone 106 (FIG. 3) within the first architecture 200A operates in conjunction with a wireless access point 215 or broadband residential gateway ("BRG") 206 over a wireless connection that is unlicensed and/or unlicensed by the Federal Communications Commission of the United States or a similar regulation body of other nations. For example, the FCC may regulate wireless connections by requiring that spectrum be licensed for use by the party utilizing the spectrum. However, certain wireless connections may be unregulated in that the frequencies of the connection may be used without license from the regulating body at any range. These frequencies that are used may be used without license from the regulating body so long as the range is below a particular threshold due to limitations on the transmitting power, or for other similar reasons. Examples of such unlicensed wireless connectivity include the Institute of Electrical and Electronics Engineers ("IEEE") 802.X standards such as the IEEE 802.11b standard, the European Telecommunications Standards Institute ("ETSI") standards such as the HiperLAN standards, Bluetooth®, and code-division multiple access (CDMA) standards such as IS-95, 1XRTT, 1XEV-DO, and 1XEV-DV.

The service provider may operate as a Public Land Mobile Network (PLMN) operator when using the unlicensed wireless connection between the digital cordless handset 104 and wireless access point 215 or BRG 206. A single service provider may provide for both the wired data network and the PLMN over the wireless connection, and may provide for additional networks as well including a PSTN 116.

The wireless access point 215, which is used in conjunction with the digital cordless phone 104 to form the wireless network, may be wired to a wired data network such as by having a wired connection between the wired access point 215 and a gateway. The gateway has a wired connection back to the remainder of the wired data network. For example, the gateway may be a broadband digital subscriber line (DSL) or cable modem. As shown in FIG. 2, the wireless access point may be incorporated into a BRG 206 that is a single box of a residence 204, place of business, or other public and private locations and that incorporates the broadband modem as well as the wireless access point. The BRG 206 may also incorporate a router function so that broadband access may be provided to multiple wireless access points and/or multiple wired access points, which is discussed in more detail below with reference to FIG. 3.

The BRG 206 communicates with a first portion 208 of a wired network that includes various functions that provide for the voice and data services to the digital cordless handset 104. For example, the first portion 208 may provide a home location register (HLR) 214 that maintains information for each subscriber to the voice and data services provided to the digital cordless handsets 104. The information may include identification information for the user that may be used to verify the legitimacy of an attempt to access the service and may also store an identification of the features applicable for each legitimate user. A domain name server (DNS) 216 may be provided as well as other standard network servers to provide for Internet services to communications devices linked to the BRG 206 or wireless access point 215.

The digital cordless handset 104 may contain a unique subscriber identity that includes the identity of the user and the identity of the service provider of the user. This unique subscriber identity information may be stored on a Subscriber Identity Module (SIM) card. Thus, when the user attempts to access voice and data services by using the digital cordless handset 104 within range of a wireless access point 215 or BRG 206, the identification information is obtained from the SIM card and may be compared to the information of the HLR 214 to determine whether to permit voice and data services to the handset 104 and to determine what features should be provided to the user of the handset 104.

The first portion 208 of the wired data network is also linked to a softswitch 210 which connects to an application server 212. As is needed for a particular situation, the softswitch 210 interconnects the application server 212 to the digital cordless handset 104 to provide various features of the voice and data services as dictated by the information maintained by the HLR. For example, the user of the digital cordless handset may subscribe to messaging and/or directory services that are provided from the application server 212. For example, voicemail may be maintained for the user on the application server 212. Furthermore, white pages and yellow pages directories may be accessible by the cordless handset 104 from the application server 104. Additionally, as discussed below in relation to FIG. 3, restrictions on use of the handset 104 may be defined and implemented by the application server 212 to limit the amount of calls or time per call for particular users such as children.

The first portion 208 of the wired data network is linked by a media gateway 220 to downstream devices. The media gateway 220 exchanges voice and other communications with a gateway mobile switching center (GMSC) 222 which exchanges the voice and other communications with the PSTN 116 and the licensed wireless network 112. This allows voiced telephone calls to be established between the digital cordless handset and telephones remotely located on the PSTN 116 through central offices (CO) 218. This also allows communications directed to the unlicensed wireless network 112 to be routed to the licensed wireless network, as further explained herein. Likewise, the media gateway 220 exchanges data communications with a gateway general packet radio service (GPRS) service node (GGSN). The GGSN exchanges data communications with the remainder of the wired data network 114, such as the global Internet. This allows data communications to occur between devices connected to the wireless access point 215 or BRG 206 and the remainder of the wired data network 114.

The voice communications provided through the digital cordless handset are of a format suitable for delivery over at least the first portion 208 of the wired data network. An example of such a voice communication protocol is voice over Internet protocol (VoIP). The VoIP protocol allows for packetized transfer and routing of packets containing data representative of voice. Thus, the digital cordless handset 104 exchanges voice communication through the first portion 208 of the wired data network and with the downstream media gateway 220 and subsequent devices by exchanging VoIP packets to establish bi-directional communication. The VoIP incoming and outgoing calls may be established by use of the Session Initiation Protocol (SIP). The SIP may be stored on the SIM card so that the card may be moved from one handset 104 to another or to a laptop or other computing device equipped with audio capabilities to allow the user to be identified and place VoIP calls from the chosen device.

The data communications provided through the digital cordless handset are also of a format suitable for delivery over the first portion 208 of the wired data network and through subsequent downstream data network devices. Accordingly, such data communications may also be packetized data transmissions that utilize a network routing scheme such as Internet Protocol (IP).

The VoIP and IP communications from the digital cordless handset 104 may be further encapsulated in frames for the lower levels of a communications protocol stack. Thus, for example, there may be Ethernet frames encoded within DSL frames between the BRG 206 or wireless access point 215 and the wired data network portion 208. These Ethernet frames encoded within DSL frames carry the VoIP and IP packets and establish bi-directional communication between the digital cordless handset 104 and at least the wired network portion 208.

To initially begin communications with a digital cordless handset 104, 106, the handset 104, 106 must be registered as a communications device with the wireless access point 215 or BRG 206. Generally described, when a telephone 104, 106 enters the range of a wireless access point 215, the telephone 104, 106 detects the unlicensed connectivity source (e.g. IEEE 802.X, ETSI HiperLAN, Bluetooth, and the like) and registers with the wired data network via the wireless access point 215 to allow the telephone 104, 106 to engage in digital communications over the wired data network 114. A mobility management function may be utilized for managing the transition of the telephones 104, 106 onto the wired data network 114 via the wireless access points 215 or the transition from the telephones 104, 106 from a licensed spectrum network to the wired data network via unlicensed spectrum via the wireless access points 215. The mobility management function may be a software module resident on the application server 212, 240, or the mobility management function may reside on a separate authentication, accounting and authorization (AAA) system accessible via the digital network portions 208, 236 for managing user access to the wired data network 114 described herein.

According to one example method of transitioning the telephone 104, 106 onto the wired data network via the wireless access points, the digital cordless handset 104, 106 may be provided with a medium access control (MAC) address that is broadcast from the handset 104 to the BRG 206 or wireless access point 215 over the unlicensed wireless connection. The digital cordless handset 104 is then assigned an IP address that is associated with the MAC address of the handset 104. This allows communications from the wired data network 208 destined for the IP address assigned to the handset 104 to be properly delivered to the handset having the MAC address associated with the assigned IP address. According to another example method of transitioning the telephone 104, 106 onto the wired data network via the wireless access points, a registration and authentication process, such as Radius authentication, may be used where a user of the telephone 104, 106 is required to provide a user name and password for access via the wireless access points 215 to the wired data network 114. As should be understood, a user name and password may be stored in the telephone 104, 106 so that the user does not have to enter the user name and password each time access is desired.

During use, the digital cordless handset 104 may move from an area serviced by one wireless access point 215 to an area serviced by another wireless access point. For example, a user may be using the handset 104 through the BRG 206 at home and then travel to a shopping center where the handset 104 operates through the wireless access point 215. This transition may be seamless by the use of conventional handoff procedures where the two areas are not separated by a dead zone lacking adequate signal. Thus, the wired data network portion 208 detects the presence of the cordless handset 104 in one area as reported by the wireless access point for that area and then detects the presence of the cordless handset 104 in another area. As discussed above, this may be done by a recognition of the MAC address being broadcast by the handset device that is received upon the handset device entering a particular area serviced by a wireless access point 215 or BRG 206. Thus, when the handset 104 transitions from one area to the next, the new area receives the broadcast MAC address and the wired data network 208 receives indication that the IP address assigned to the MAC address corresponds to the new wireless access point. The VoIP and IP communications with the handset 104 may then continue in the new area by routing packets accordingly.

The transition may not always be continuous. For example, there may be instances where the handset 104 travels from one service area to another with a break in service between the two areas due to a dead zone where signal is not available. However, upon the handset 104 entering a new area serviced by a BRG 206 or wireless access point 215, the handset 104 is again detected according to a MAC address and the IP, and VoIP packets for the handset 104 may then be exchanged with the new area. Regardless of whether the transition results in a break in service, the handset 104 may operate among any or all of the wireless access points 215 and/or BRGs 206 that are made available by the service provider for the user.

The architecture 200B for the second service provider mirrors that of the architecture 200A for the service provider of the user. Accordingly, the digital cordless handset 104 may be used within the architecture 200B for the second service provider as well as the first architecture 200A. Thus, the user of the digital cordless handset 104 may transition from an area covered by architecture 200A being serviced by the service provider of the user to an area being covered by architecture 200B being serviced by another service provider.

The architecture 200B contains an application server 240 for providing any enhanced services to subscribers and to guest users entering the service area of architecture 200B. The application server 240 is linked to a wired data network portion 236 through a softswitch 238. BRGs 234 and wireless access points 217 are wired to the data network portion 236. The data network portion 236 communicates with the downstream media gateway 246 to transfer voice communications through the GMSC 250 to the PSTN 116 and to transfer data communications through the GGSN to the remainder of the wired data network 114. A CO 245 links conventional PSTN phones of the area covered by architecture 200B to the PSTN 116. According to one embodiment, digital VoIP communication may be made directly from a telephone 104 and telephones 106, 304A, 304B (FIG. 3) from the data network portion 208 through the wired data network 114 and to the data network portion 236 to other digital telephones 104, 106, 304A, 304B.

The wired data network portion 236 may also provide various other data network servers to assist in providing the voice and data services to the users and guest users of the architecture 200B. The DNS server 244 may provide for Internet related services. The HLR 242 may provide for the determination of the legitimacy and available features for the cordless handset users. However, for guest users who have transitioned from their home service provider's area to the area covered by architecture 200B of another service provider, then the HLR 242 may also provide a Visitor Location Register (VLR) function. The VLR queries back to the home network of the guest user to determine the credentials of and features available to the guest user by retrieval of information from the HLR 214 of the guest user's home network. Accordingly, when the guest user enters the area covered by the second service provider, the identity of the guest user may be obtained from the SIM card of the handset 104 and verified by the VLR function prior to allowing voice and data services to be provided.

A first wireless network architecture 252 is illustrated for communicating calls placed thought the licensed wireless network 112, described above with reference to FIG. 1. A second wireless network architecture 264 is illustrated that mirrors the architecture 252 such as would be provided by a different wireless communications services provider from the services provider operating the network architecture 252. Dual mode telephones 106, 266 are illustrated for wireless communication through the wireless networks 252, 264 through a licensed wireless network 112. It should be appreciated that the telephone 106, 266 may also be in the form of conventional wireless telephone 108 for communication through the licensed wireless network 112 only. A wireless network architecture 252, 264 includes a base transceiver station 256, 268, a base station controller 258, 274 and mobile switching centers 260, 272 for communicating wireless transmissions from the telephone 106, 266 from the licensed wireless network 112 to the public switch telephone network 116 and the wired data network 114. A serving general packet radio service node 262, 270 is also illustrated in the wireless network architecture 252, 264 for processing data communications from the telephones 106, 266 through the wireless network 112 to the wired data network 114. It should be appreciated that the dual mode telephone 106 may operate through the wired data network 114 via wireless access points in the manner described above for the telephone 104

Figure 3:
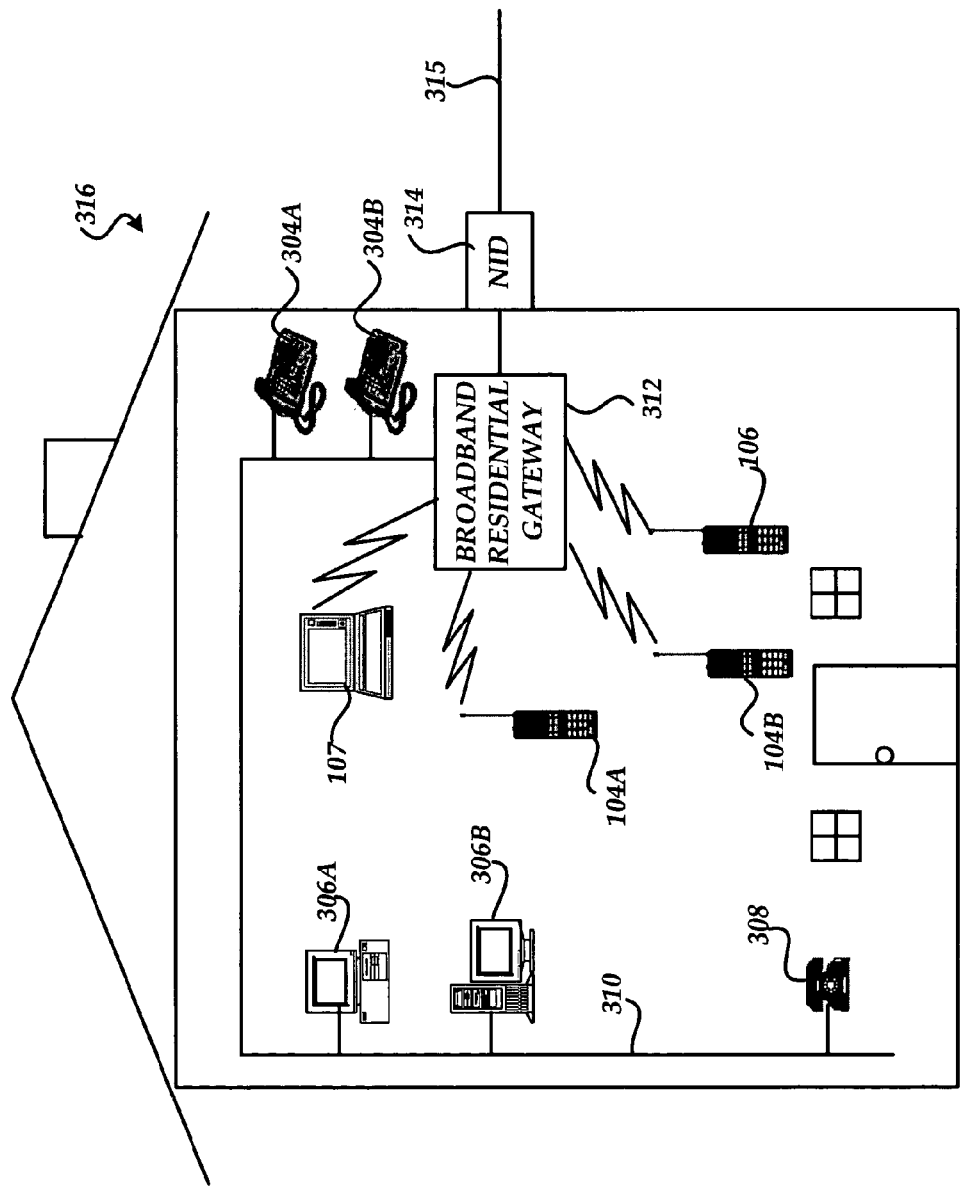
FIG. 3 illustrates a network architecture wherein an unlicensed wireless access point is integrated for VoIP communications through a broadband residential gateway according to embodiments of the present invention.

FIG. 3 illustrates a public or private place 316, such as a user's residence, or business in greater detail to illustrate the use of a BRG 312 to provide voice and data services to digital cordless handsets 104A, 104B and dual mode telephone 106, and also to additional devices such as wired VoIP phones 304A, 304B. The wired VoIP phones 304A and 304B may be wired via a digital service line such as a DSL line where each phone may operate over a separate derived line operating through a single DSL line. The cordless/wireless telephones 104, 106 may operate through the same line as the phones 304A, 304B via the BRG 312 via wireless access points 215 integrated with the BRG 312. In the instance where the BRG is linked to the wired data network over a telephony connection, a copper pair 315 interconnects a Network Interface Device (NID) to a CO. At the CO, the data packets including the IP and VoIP are directed to the wired data network portion while any PSTN telephone signals are directed from the plain old telephone service (POTS) telephone 308 of the user to the PSTN. An alternative is to utilize a cable modem within the BRG 312 and the community access television (CATV) system is used to carry the data between the wired data network and the BRG 312.

The BRG 312 of this example shown includes a DSL modem linking the BRG 312 through the NID 314 to the CO over the copper pair 315. The BRG 312 includes routing functionality to accommodate multiple devices to form a local area network (LAN) for the location 316. The BRG includes a wireless access point to communicate over the unlicensed wireless connection to the digital cordless handsets 104A, 104B, dual mode handset 106, and a wireless equipped personal computer 107. The BRG 312 also includes a wired access point to communicate over wired connections to VoIP phones 304A, 304B and personal computers 306A, 306B. The wired connection may be of various forms such as conventional Ethernet or over a home phoneline network alliance ("HPNA") connection. As shown, the wired connection is an HPNA connection over the copper pair telephone line 310 of the location 316. The copper pair telephone line 310 carries POTS signals of the POTS phone 308 as well as the data signals of the personal computers 306A, 306B and the VoIP phones 304A, 304B.

Each of the VoIP capable devices linked to the BRG 312 may be used to place telephone calls. Furthermore, each VoIP capable device may have its own telephone number so that multiple VoIP calls may occur to provide access to or be accessed from the wired data network through the BRG 312. Alternatively or in addition, a call to one telephone number may cause each of the VoIP phones to ring so that the call may be answered on any one of the phones. Thus, the MAC address/IP address of each phone may be associated with its own telephone number and/or a telephone number applicable to all phones of the location 316.

Each user of the location 312 may have his or her own SIM card to use in the VoIP capable device. As discussed above, the identity of the user is determined by the wired data network from the information of the SIM card, and any limitations on use for that individual may be applied. Thus, the application server of the wired data network may maintain a restrictions database where a parent may set forth restrictions on the use of the VoIP communications of children of a household. These restrictions as well as other options for the voice and data services may be set forth by the subscriber accessing the application server though a web interface provided to the personal computer 306A, 306B, or 107.

Operation Via a Wired Data Network Via Unlicensed Spectrum

Figure 4A:
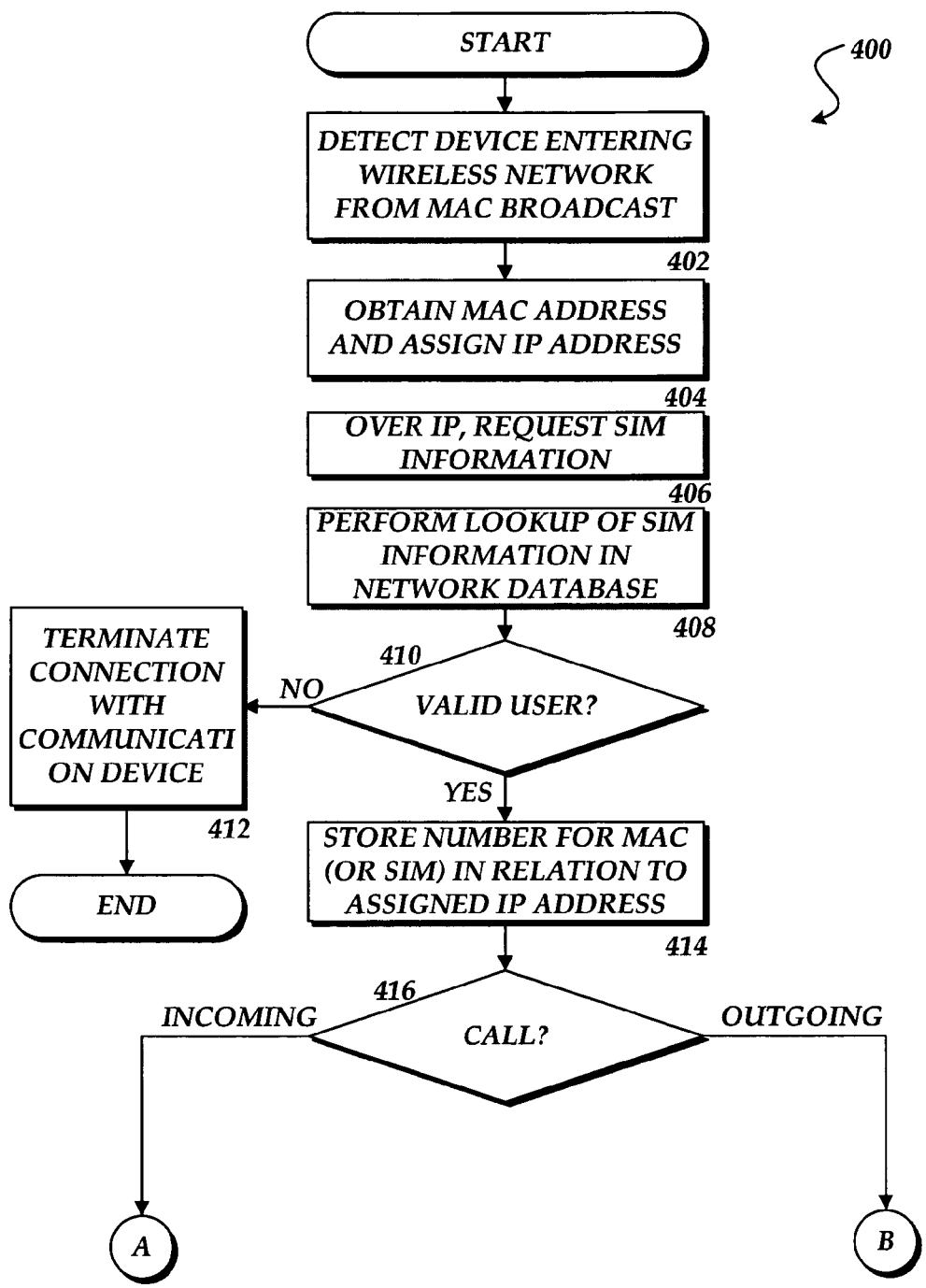
FIGS. 4A and 4B are flow diagrams illustrating a method according to embodiments of the present invention for utilizing VoIP communications via unlicensed wireless connectivity through a wireless access point according to embodiments of the present invention.
Figure 4B:
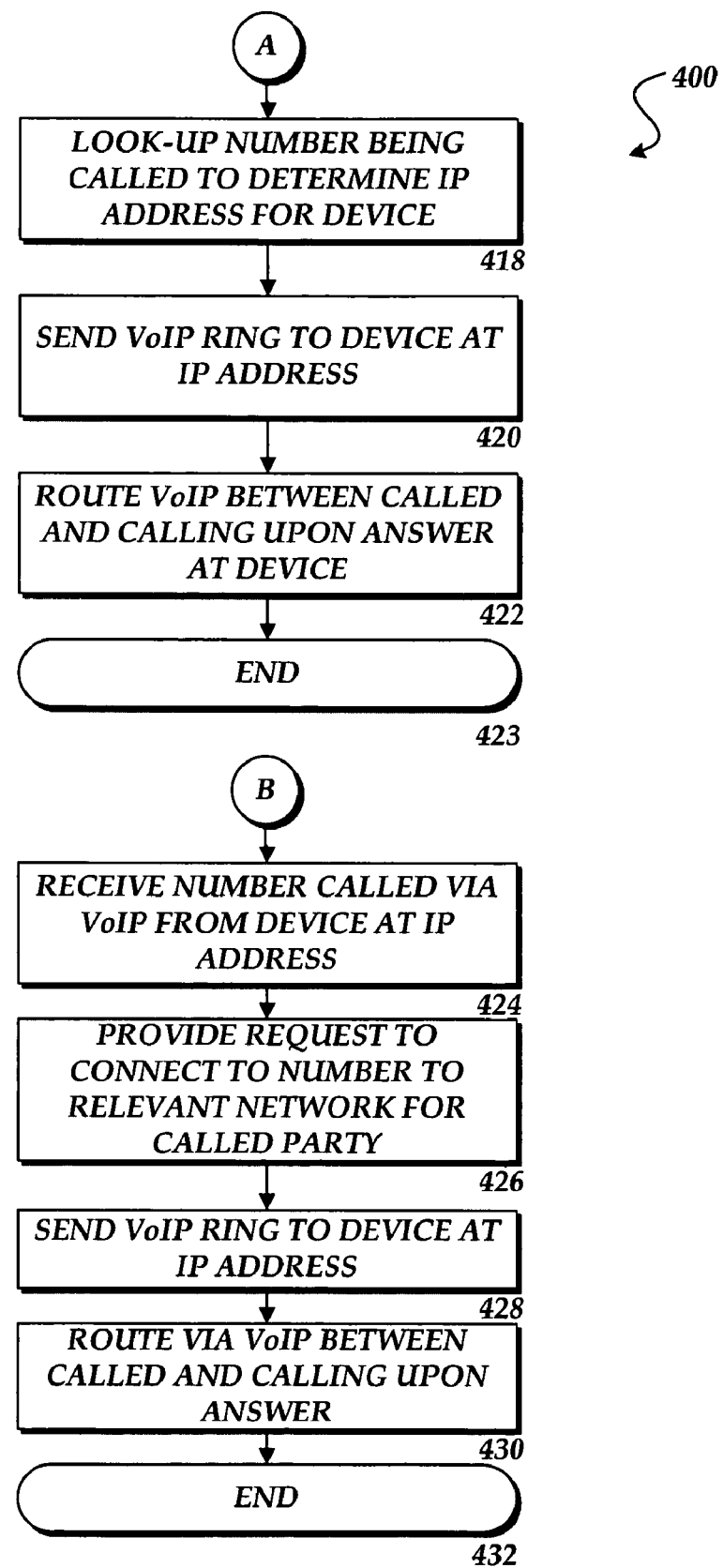

FIGS. 4A and 4B show an illustrative set 400 of logical operations for establishing voice and data services with a digital cordless handset 104. The method of accessing voice and data services via the digital cordless handset 104 described below is by way of example only and is not restrictive of other methods for accessing the wired data network via the handset 104. Other general methods for accessing the wired data network are described above. The logical operations begin at block 402 where the digital cordless handset 104 enters a service area. The wireless access point detects the handset device entering the wireless network from the MAC broadcast by the handset device. At block 404, the MAC address is obtained from the broadcast and an IP address is assigned to the handset having the MAC address. Depending upon the connectivity of the wireless access point to the wired data network, the IP address may be assigned at a local router or may be assigned at a remote router of the wired data network.

Once the IP address is assigned such that IP packets may be exchanged with the digital cordless handset, then the wired data network requests the unique subscriber identity information from the handset over the IP connection at block 406. At block 408, a look-up of the unique subscriber identity information is performed in a network database such as an HLR in the wired data network. A determination is made at block 410 about whether the user identified by the unique subscriber identity information is a valid user based on the look-up in the database. The unique subscriber identity information may not be found, thereby indicating the user is not a subscriber and should not be given access to the network. The connection with the handset is terminated at block 412 and the operations end.

Alternatively, the unique subscriber identity information may be found by the look-up. The unique subscriber identity information may correspond to a subscriber of the current service provider as noted by the unique subscriber identity, or may correspond to a subscriber of other service providers as indicated by the unique subscriber identity who is a guest user for the current service provider. Once a valid user has been found based on the look-up, the telephone number found from the look-up that is known for the MAC or unique subscriber identity information identifying the handset is stored in relation to the assigned IP address at block 414. Now, the telephone number of the device is associated with the IP address so that incoming and outgoing calls can be effectively routed between the handset, the wired data network, and any other networks that are involved such as the PSTN.

At block 416, a determination is made as to whether the handset 104 is placing an outgoing call or whether there is an incoming call directed to the handset 104. When an incoming call is directed to the handset 104, the call is received in the wired data network, such as through the GMSC from the PSTN. A look-up is performed within the wired data network to determine the IP address that is associated with the called number at block 418. Upon determining the proper IP address, a VoIP ring to the handset 104 having the IP address is performed via a VoIP session at block 420 to alert the user of the handset 104 that there is an incoming call. The VoIP session may be initiated through operation of the SIP function that may be performed at the handset 104, or may also be provided by the wireless access point or BRG that is in communication with the handset 104. VoIP packets are then routed between the handset 104 and the wired data network at block 422 upon the user of the handset 104 answering the incoming call. The logical operations then end at block 423 once the call is finished.

When an outgoing call is being sent from the handset 104, a number being called is received into the wired data network. The number is received over a VoIP session with the IP address of the handset 104, such as a session established through the SIP function, at block 424. Upon receiving the dialed number at the wired data network, a request to connect is provided to the relevant network for the called party at block 426. For example, the number dialed may be a number reachable through the PSTN so that the GMSC linked to the wired data network routes the called number to the PSTN. This allows a connection to the desired telephone line identified by the telephone number to be established.

While the called party's telephone line is ringing, a VoIP ring may be transferred back to the handset 104 to provide the user with an indication that the called party's phone is ringing at block 428. Then, VoIP communications are routed between the handset and the wired data network at block 430 upon the called party answering the call from the handset 104. The logical operations then end at block 432 once the call is finished.

Operation of Single Telephone Number System

Figure 5:
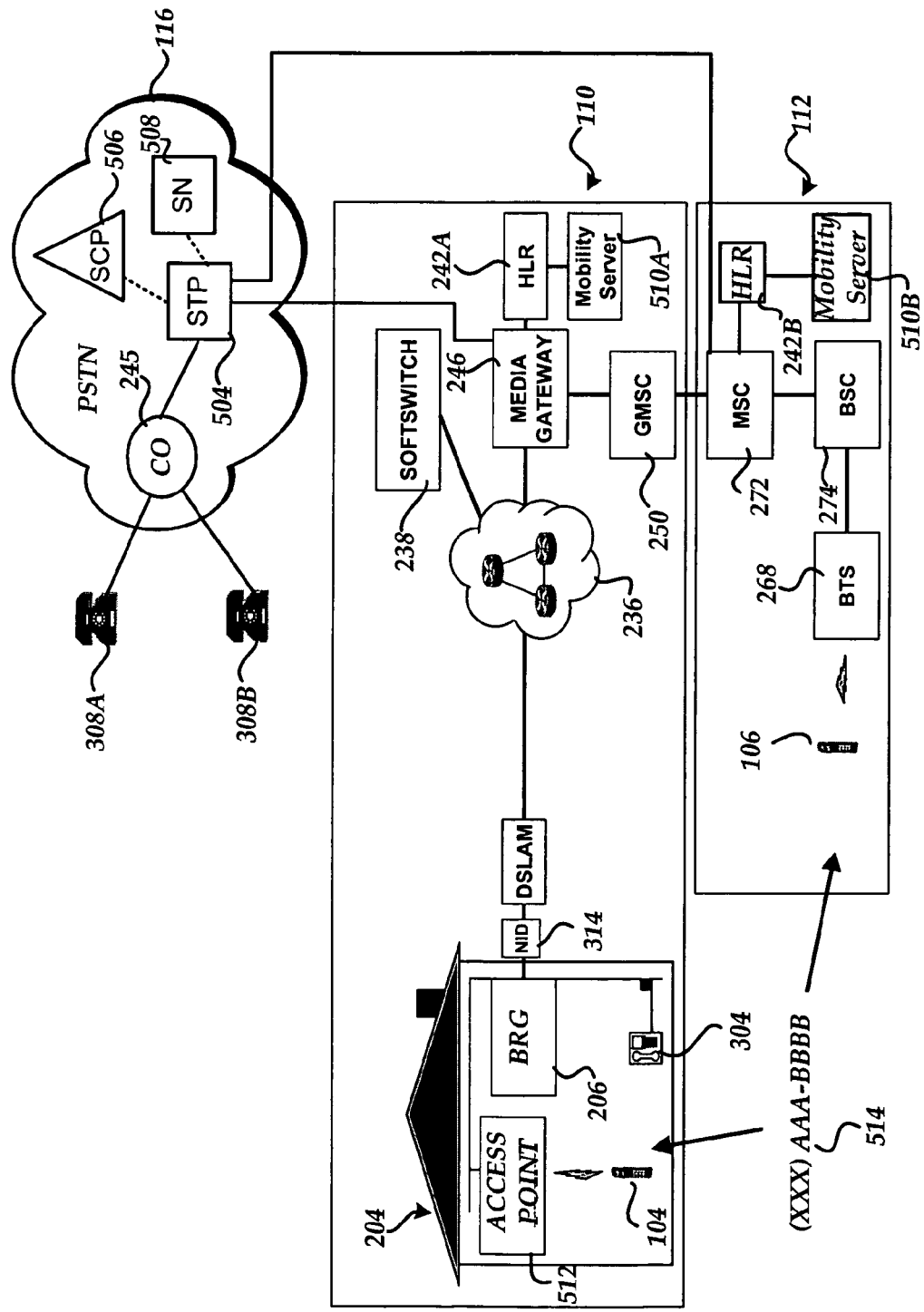
FIG. 5 illustrates a telecommunications architecture showing interaction between a wireline telecommunications system, a wireless telecommunication system, a broadband packet data network, and public switch telephone network according to embodiments of the present invention.

Referring now to FIG. 5, another embodiment of the invention will be described. According to this embodiment of the invention, a single telephone number is assigned to two or more handsets, each of which may be operated in a different telecommunications network. For instance, according to one embodiment of the invention, a first handset is operable for use with an unlicensed wireless network, such as the unlicensed wireless network 110. A second handset is operable for use with a licensed wireless network, such as the network 112. When a call is initiated to the single telephone number, both the handset operable for use with the unlicensed wireless network 110 and the handset operable for use with the licensed wireless network 112 will be rung. Either handset may then be used to receive the incoming communication. Moreover, according to this embodiment of the invention, along with a single telephone number, a single personal voice mailbox that can be accessed from any of the handsets assigned to the single telephone number may be provided. A single bill for service for the single telephone number may also be provided to a subscriber of the single telephone number service.

According to other aspects of this embodiment of the invention, a single telephone number may be assigned to a wired handset, such as the handset 304, connected to a VoIP network. The handset 304 may be assigned an identical telephone number to a handset 106 or 108 operative for use with a licensed wireless network 112. When a user is in a home 204, called party identification and/or distinctive ringing may be associated with incoming calls on the handset 304 and incoming calls may be answered on any VoIP enabled handset in the home 204.

As discussed above, the handset 104, 106, 108 and the handset 304 are rung in a substantially simultaneous manner when an incoming call is received, such as from the handset 308A. When a user is in the home 204, outgoing calls may be made on the assigned telephone number from any handset in the home 204. Users are able to select the personal telephone number for outgoing calls via means provided by the handset 304. Moreover, users of the single number service can administer the service via a web browser equipped personal computer. In multi-user households, a user can administer which VoIP line rings on which VoIP phones. Additionally, other services may be provided. For instance, a parent may be able to place limits, such as the time of day and day of week and/or number of minutes, on a child's use of their personal telephone number, including both wireless access provided through the licensed wireless network 112 and wireline access provided through the unlicensed wireless network 110.

Turning now to FIG. 5, additional details regarding the embodiment of the invention wherein a single telephone number is assigned for use with a plurality of handsets will be described. As shown in FIG. 5, the unlicensed wireless network 110 may include one or more digital cordless telephones 104 for use with a wireless access point 512 and a broadband residential gateway 206. As discussed above, VoIP technology is utilized to send and receive telephone calls on the digital cordless phone 104 through the packet switched network 236. As also discussed above, a softswitch 238 may be utilized to provide various services to a user of the digital cordless phone 104. For instance, a voicemail service may be provided through the softswitch 238. Additionally, one or more wired handsets 304 are also connected to the BRG 206. Voice and data services may also be utilized through the wired handsets 304 in a manner similar to that provided through the digital cordless phone 104.

As also shown in FIG. 5, the unlicensed wireless network 110 may be configured for interoperability with the licensed wireless network 112. In particular, according to one embodiment of the invention, a subscriber may be provided one or more digital cordless phones 104 and one or more wired handsets 304 for use with the network 110. The same subscriber may also be provided a handset 106, 108 operable for use with the licensed wireless network 112. For instance, a subscriber may be provided a cordless handset 104 for use with the access point 512 when in the home 204 and a handset 106, 108 for use with the licensed wireless network 112 when outside the home. In this embodiment of the invention, a single telephone number 514 may be assigned to the digital cordless phone 104 and the handset 106. When a communication is received that is directed toward the single telephone number 514, a ring tone is generated at the digital cordless phone 104 and at the handset 106. The ring tone may be generated substantially simultaneously at the digital cordless phone 104 and the handset 106.

According to other embodiments of the invention, a single telephone number may be assigned to both a handset 106, 108, 308A configured for wired use with the PSTN 116 and the digital cordless phone 104. As in the embodiments described above, a single telephone number 514 may be assigned to the handset 106, 108, 308A and the digital cordless phone 104. When an incoming call is directed toward the single telephone number 514, the handset 308A and the digital cordless phone 104 may be rung simultaneously.

In order to provide the functionality described herein for utilizing a single telephone number with multiple handsets, an interface is provided between the networks 110 and 112 and the PSTN 116. In particular, the media gateway 246 interfaces with a signal transfer point (STP) 24 via a communication link. The communication link may employ, for example, the signaling system 7 (SS7) switching protocol. The STP 24 may be a multi-port high speed packet switch that is programmed to respond to the routing information in the appropriate layer of the switching protocol and to route the data packets to their intended destinations. The MSC 272 of the network 112 may also similarly be connected to the STP 504 via a communication link.

One of the intended destinations of the data packets from the STP 504 is a service control point (SCP) 506. The STP 504 is in communication with the SCP 506 via a communication link, which may also employ the SS7 switching protocol. The SCP 506 may comprise an intelligent database server such as, for example, an intelligent network service control point available from LUCENT TECHNOLOGIES, INC., Murray Hill, N.J., and may have associated with it a network database for storing network data. The intelligent functionality of the SCP 506 may be realized by application programs, such as programmable service program applications (SPA), which are executed by the SCP 506. In addition, another of the functions of the SCP 506 is the hosting of a network database, which may store subscriber information, such as subscriber call management profiles used in providing enhanced calling services such as the single number telephone service of the present invention.

A typical local exchange carrier (LEC) also includes a number of central offices 245 for interconnecting customer premises terminating equipment with the PSTN 116, such as the handsets 308A-308B. The central office 245 may include one or more service switching point (SSP) switches. Each SSP switch has a number of subscriber lines connected thereto. The subscriber lines may be, for example, conventional twisted paired loop circuits connected between the switches and the telephone drops for the customer premises. Subscriber lines may also comprise trunk circuits, such as T1 trunk circuits. Typically, the number of subscriber lines connected to each switch is on the order of 10,000 to 100,000 lines. Each of the subscriber lines is connected to a terminating piece of customer premises equipment, represented in FIG. 5 by the handsets 308A-308B. Alternatively, the terminating equipment may be other types of telecommunications units such as, for example, a telecopier, a personal computer, a modem, or a private branch exchange (PBX) switching system.

The features of the PSTN 116 illustrated in FIG. 5 include a services node (SN) 508. The SN 508 may be, for example, a compact services node available from LUCENT TECHNOLOGIES, although the SN 508 may be any other type of available AIN-compliant SN. The SN 508 may be connected to one or more of the SSP switches via a communications link which may be, for example, an integrated service digital network (ISDN) connection, including basic rate interface or primary rate interface lines. According to other embodiments, the communications link may be, for example, a T1 trunk circuit. The SN 508 may be used primarily when some enhanced feature or service is needed that requires an audio connection to the call such as, for example, the call return and calling name services. Similar to the SCP 506, the intelligent functionality of the SN 508 may be realized by programmable applications executable by the SN 508.

In order to keep the processing of data and calls as simple as possible at the switches, such as the SSP switches contained in the central office 245, a set of triggers may be defined at the SSP switches for each call. A trigger is an event associated with a particular subscriber line that generates a query that is sent from the SSP switch servicing the particular subscriber line to the SCP 506 via the STP 504. The triggers may be originating triggers for calls originating from the subscriber premises or termination triggers for calls terminating at the subscriber premises. The trigger causes a message in the form of a query to be sent from the SSP switch to the SCP 506.

In response to receiving such a query, the SCP 506 in turns interrogates the network database stored at the SCP 506 to determine whether some customized call feature or enhanced service should be implemented for the particular call or whether conventional dialup telephone service should be provided. The results of the database inquiry are sent back from the SCP 506 to the SSP switch via the STP 504. The return packet includes instruction to the SSP switch as to how to process the call. The instructions may be to take some special action as a result of a customized calling service or enhanced feature. For example, for an enhanced calling feature requiring the capabilities of the SN 508, the return message from the SCP 506 may include instructions for the SSP switch to route the call to the SN 508. In addition, the return message from the SCP 506 may simply be an indication that there is no entry in the database that indicates anything other than conventional telephone service should be provided for the call. The query and return messages may be formatted, for example, according to conventional SS7 transaction capabilities application part formats. U.S. Pat. No. 5,438,568, which is hereby expressly incorporated by reference, discloses additional details regarding the functioning of an advanced intelligent network.

As will be discussed in greater detail below, a single telephone number may be assigned to multiple handsets utilized in conjunction with the PSTN 116, the unlicensed wireless network 110, and the licensed wireless network 112. When a call is received and directed to a single telephone number, a termination attempt trigger is generated at the central office 245. In response thereto, a message is transmitted to the SCP 506 requesting further instructions on the handling of the incoming communication. Based on the content of the database stored at the SCP 506, the incoming communication is routed to the SN 508.

Once the call has been routed to the SN 508, an application program executing at the SN 508 initiates outgoing telephone calls to each of the handsets to which the single telephone number has been assigned. For instance, the SN 508 may initiate an outgoing communication to the digital cordless phone 104 and simultaneously initiate an outgoing communication to the handset 108. Similarly, if the single telephone number has been assigned to a traditional wired handset 308A connected to the PSTN 116 and a digital cordless phone 104 operative for use with the network 110, the SN 508 is operative to simultaneously initiate an outgoing communication to the handset 308A and the digital cordless phone 104 in response to the receipt of an incoming communication.

The SN 508 is further operative to determine whether the outgoing communications have been answered at either handset to which the communication was directed. If no answer is received at either of the handsets within a predetermined period of time, the SN 508 is operative to route the incoming communication to the softswitch 238 wherein a voicemail service may be provided. However, if the outgoing communication is answered at either the digital cordless phone 104 or the handset 108, the SN 508 is operative to route the incoming communication to the handset on which the call was received. The outgoing communication initiated by the SN 508 to the handset that was not utilized to answer the telephone call is then dropped. It should be appreciated that the single telephone number service as described herein is described in the context of utilizing a single number with two handsets. However, using the methods described herein, the single number service may be extended to any number of additional handsets. Additional details regarding the operation of the single telephone number service will be provided below with respect to FIGS. 6A-6B.

Figure 6A:
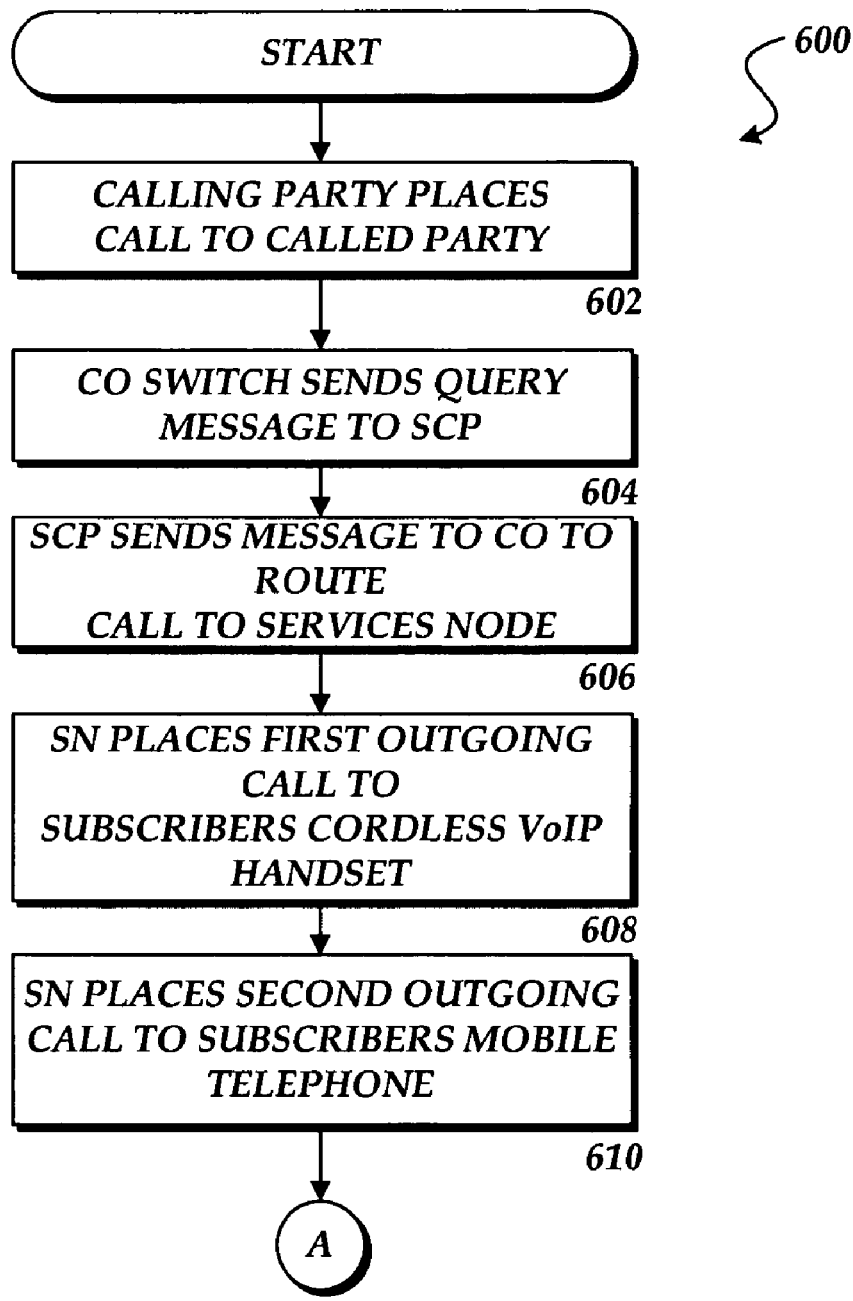
FIGS. 6A and 6B are flow diagrams illustrating a method for calling a wireless telecommunications device and a VoIP telecommunications device via a single telephone directory number according to embodiments of the present invention.
Figure 6B:
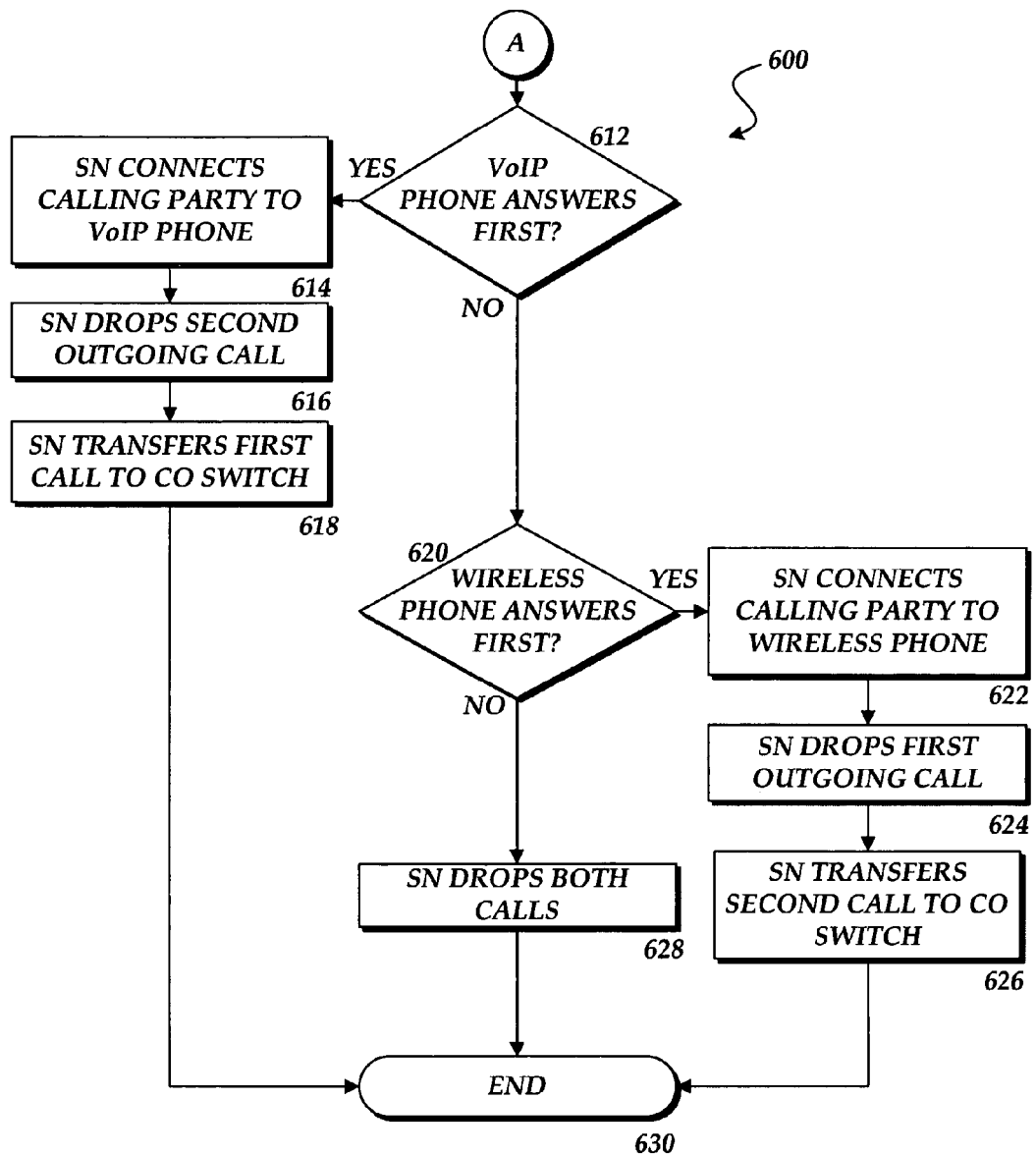

FIGS. 6A and 6B are flow diagrams illustrating a method for calling a wireless telecommunications device and a VoIP telecommunications device via a single telephone directory number according to embodiments of the present invention. Turning now to FIGS. 6A and 6B, an illustrative process flow for implementing a single telephone number service in various embodiments of the invention will be described. FIGS. 6A and 6B are described herein with reference to the PSTN 116, and the networks 110 and 112, shown and described above with respect to FIG. 5. In addition, the process illustrated in FIGS. 6A and 6B is described with reference to a subscriber utilizing the single number calling service with respect to a digital cordless phone 104 and a handset 108 that have been assigned the same phone number 514. It should be appreciated, however, that the single number service may be utilized with the digital cordless phone 104 and a wired telephone handset, such as the handsets 308A-308B.

Referring now to FIGS. 6A and 6B, the routine 600 begins at block 602 where a calling party places a call to the called party that is a subscriber to the single number telephone service. In order to initiate such a call, the calling party may utilize a handset, such as the handset 308A, to place a telephone call to the single telephone number 514 that has been assigned to the subscriber's handsets. The routine 600 then continues from block 602 to block 604, where a termination attempt is made at the subscriber's number. In response to the termination attempt being made, the CO switch 245 sends a query message to the SEP 506.

From block 604, the routine 600 continues to block 606, where the SCP 506 transmits a message to the CO 245 instructing the CO 245 to transmit the incoming communication to the SN 508. In response to the message, the CO 245 transfers the incoming communication from the handset 308A to the SN 508 for further processing. When the communication is received at the SN 508, the SN 508 places a first outgoing call to the subscriber's digital cordless phone 104. Substantially simultaneously thereto, the SN 508 places a second outgoing call to the subscriber's handset 108. It should be appreciated that, in order to account for delays in the processing of calls through a wireless network, the call to the handset 108 may be placed by the SN 508 prior to initiating the outgoing call to the digital cordless phone 104.

From block 610, the routine 600 continues to block 612, where the SN 508 makes a determination as to whether the subscriber's digital cordless phone 104 has been answered before the handset 108 has been answered. If the digital cordless phone 104 is answered prior to the answering of the handset 108, the routine 600 branches to block 614. Otherwise, the routine 600 continues to block 602, where a determination is made as to whether the handset 108 is answered by the subscriber or other user prior to answering the digital cordless phone 104. If the handset 108 is answered prior to the digital cordless phone 104, the routine 600 branches to block 622. Otherwise, the routine 600 continues to block 628, where both outgoing communications initiated by the SN 508 are dropped. It should be appreciated that a predetermined period of time may elapse prior to dropping the outgoing communications initiated by the SN 508. In addition, it should be appreciated that the incoming communication from the handset 308A may be routed by the SN 508 to a softswitch 238 for the delivery of voice mail services.

At block 614, the SN 508 connects the calling party to the digital cordless phone 104. The routine 600 then continues to block 616, where the SN 508 drops the outgoing call that was placed to the handset 108. Once the outgoing call placed to the handset 108 has been dropped, the SN 508 transfers the completed call to the CO 245. This occurs at block 618.

At block 622, the SN 508 connects the calling party to the handset 108. The routine 600 then continues to block 625, where the SN 508 drops the outgoing communication that was placed to the digital cordless phone 104. The routine 600 then continues to block 626 where the SN 508 transfers the completed call to the CO 245 for further processing. From blocks 618, 628, and 626, the routine 600 continues to block 630, where it ends.

Operation of Dual Mode Telephone

Another embodiment of the present invention provides integrated digital voice and data service that includes a seamless integration of wireless (mobile) access using licensed spectrum and cordless wired access using unlicensed spectrum via a dual mode telephone 106. The dual mode telephone 106 functions as a wireless phone operating over licensed wireless spectrum via a licensed wireless network 112 when a user is outside of buildings and as a digital cordless phone operating over unlicensed spectrum via the unlicensed wireless network 110 with a wireless access point in conjunction with VoIP digital voice technology when a user is inside buildings, such as the user's home. In one embodiment, the dual mode telephone 106 operates as a GSM/GPRS handset when the user is outside and as an IEEE 802.11b handset when the user is inside buildings equipped with a wireless access point. According to this embodiment, the handset telephone 106 includes Session Initiation Protocol (SIP) software and includes a Subscriber Identity Module (SIM) card. The SIM card will be used to store the user's unique subscriber identity which includes the user's service provider.

The dual mode telephone 106 supports multiple users per household or other building or facility wherein each user may have a unique personal phone number and their own dual mode telephone 106. The user can administer the functionality of the telephone 106 via a web browser equipped personal computer. For example, a parent may put limits, such as time of day and day of week and/or number of minutes of use on each child's use of their personal telephone number/dual mode telephone 106. When a user is in their home, incoming calls to the user may be answered on their dual mode telephone 106 or any IP phone in the home, as described below with regard to FIGS. 10A-10B and 11A-11B. Called party identification may be associated with incoming calls by distinctive ringing and/or call announcement to distinguish to whom in the home or building the incoming call is directed.

When a user is in their home or business, outgoing calls may be made on their dual mode telephone 106 or any IP phone in the home. On IP phones, users may select their personal line for outgoing calls. The dual mode telephone handset 106 allows digital access to on-line directories via the unlicensed wireless network 110, and the directories may include personal and business information. A user can administer and edit the on-line directories using their dual mode telephone 106 or a web browser equipped personal computer or PDA.

The dual mode telephone includes personalized voice mail, and the user may access their mailbox using their dual mode telephone 106 or any IP phone in their home. Advantageously, user experience associated with accessing and using voice and data services when operating the dual mode telephone 106 in either the wireless (mobile) access mode or the cordless mode will be the same.

Figure 9:
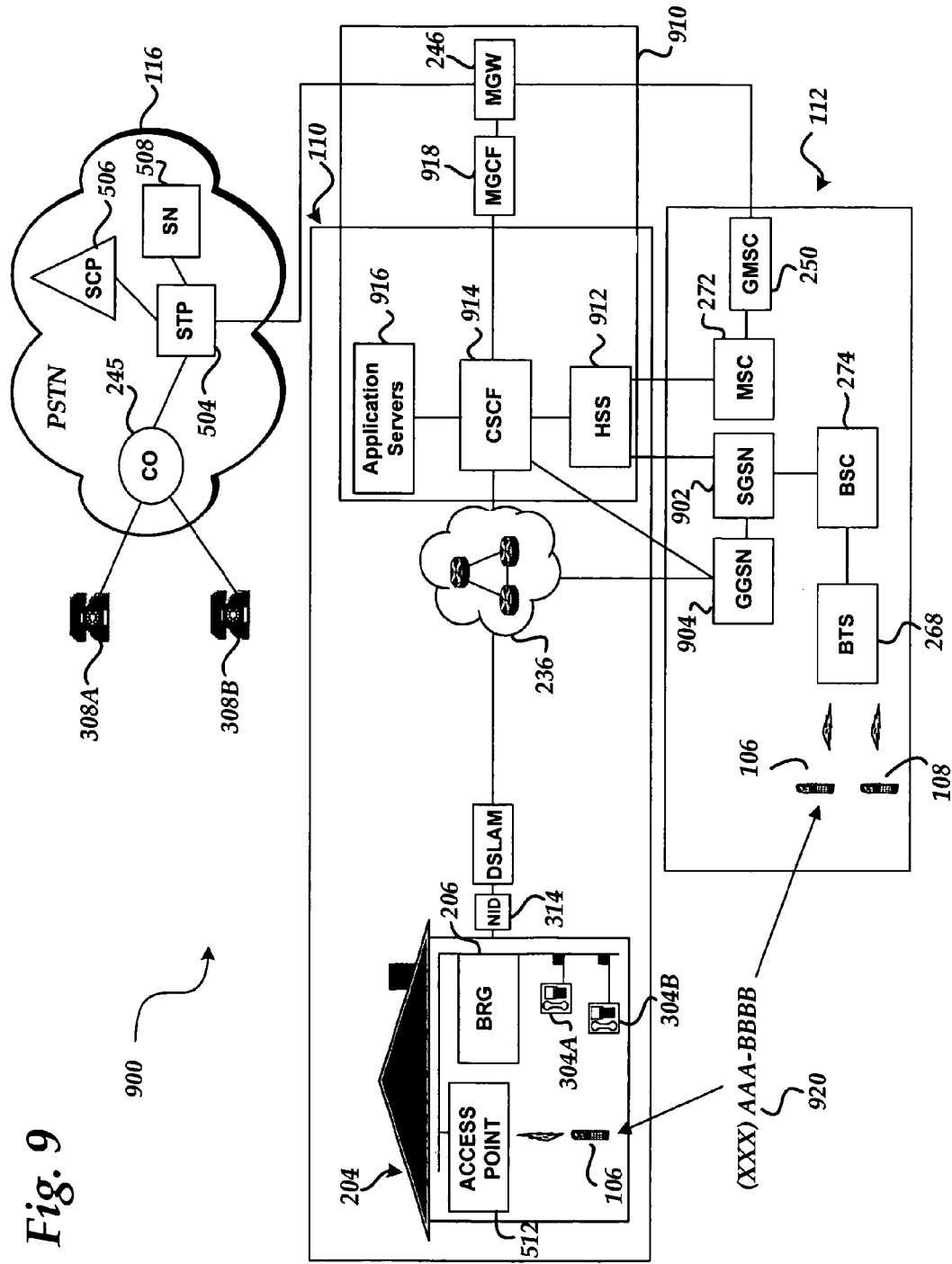
FIG. 9 illustrates a telecommunications architecture showing interaction between a wireline telecommunications system, a wireless telecommunication system, a broadband packet data network, and public switch telephone network according to an embodiment of the present invention.

FIG. 9 is a block diagram showing a communications service architecture 900 for communicating via a licensed wireless network 112 and an unlicensed wireless network 110 according to an embodiment of the present invention. When the dual mode telephone 106 is within range of the wireless access point 512, the dual mode telephone 106 operates in conjunction with the wireless access point 512 or the BRG 206 over a wireless connection that is unregulated and/or unlicensed by the Federal Communications Commission of the United States or a similar regulation body of other nations, as described above. Examples of such unlicensed wireless connectivity include the IEEE 802.X standards such as the IEEE 802.11b standard, the ETSI standards such as the HiperLAN standards, Bluetooth®, and CDMA standards such as IS-95, 1XRTT, 1XEV-DO, and 1XEV-DV.

The wireless access point 512, which is used in conjunction with the dual mode telephone 106 to form the wireless network, may be wired to a wired data network such as by having a wired connection between the wired access point 512 and a gateway. The gateway has a wired connection back to the remainder of the wired data network. For example, the gateway may be a broadband digital subscriber line (DSL) or cable modem. The wireless access point 512 may be incorporated into a BRG 206 that is a single box of a residence 204, place of business, or other public and private locations and that incorporates the broadband modem as well as the wireless access point. The BRG 206 may also incorporate a router function so that broadband access may be provided to multiple wireless access points and/or multiple wired access points.

The wireless access point 512 or the BRG 206 communicates with the packet switched network 236. VoIP technology is utilized to send and receive telephone calls on the dual mode telephone 106 through the packet switched network 236. In an embodiment of the present inventions, the packet switched network 236 is in communication with an Internet Protocol Multimedia Subsystem (IMS) network 910. The IMS network 910 is a set of standards developed by the 3rd Generation Partnership Project (3GPP) that supports a wide range of services enabled by IP based protocol such as, for example, Session Initiation Protocol (SIP). The IMS network 910 supports multiple application servers that supply a variety of services during a communication session and provides instructions that define the conditions and logic under which the application servers should be engaged in the communication session. Some of the components of the IMS 100 are illustrated in FIG. 9.

A Call Session Control Functions (CSCF) 914 is provided in a typical IMS network 910. The CSCF 914 performs signaling operations for communication session control. The CSCF 914 manages communication sessions and coordinates with other network entities for session control, service control, and resource allocation. When the dual mode telephone 106 is within range of the wireless access point 512, a communication directed to or from the dual mode telephone 106 or to or from the VoIP phone 304A is received by the CSCF 914. The CSCF 914 queries a Home Subscriber Server (HSS) 912 for service information, filter criteria, and addresses of application servers 916 associated with the called party's services. The HSS 912 is a database that maintains service profiles associated with each subscriber to the IMS network 910. A service profile contains subscriber information and preferences including a subscriber's current registration information, subscriber's roaming information, and identification information for the user that may be used to verify the legitimacy of an attempt to access the service and may also store an identification of the features applicable for each legitimate user. The HSS 912 also maintains locations of the application servers 916 associated with a subscriber's services to be engaged to assist in providing the subscriber's services during setup of the communication session. Further, the HSS 912 provides the filter criteria, or set of instructions, that define the condition and logic under which the application servers 916 associated with the subscriber's service should be engaged by the CSCF 914 during setup of the communication session.

The application servers 916 provide various features of the voice and data services as dictated by the information maintained by the HSS 912. For example, the user of the dual mode telephone 106 may subscribe to messaging and/or directory services that are provided by the application servers 916. For example, voicemail may be maintained for the user on the application servers 916. Furthermore, white pages and yellow pages directories may be accessible by the dual mode telephone 106 from the application servers 916. Additionally, restrictions on use of the dual mode telephone 106 may be defined and implemented by the application servers 916 to limit the amount of calls or time per call for particular users such as children as well as distinctive ring tones/call announcements associated with the dual mode telephone 106 and the VoIP phones 304A, 304B to be implemented depending on which phone a call is directed.

Communications directed to the dual mode telephone 106 when the telephone 106 is within range of the wireless access point 512 or to the VoIP phone 304A from either the telephone 308A serviced by the PSTN 116 or the wireless device 108 serviced by the licensed wireless network 112 are directed to a media gateway (MGW) 246 and then to a Media Gateway Control Function (MGCF) 918 to convert the communications to a format that the IMS network 910 and the packet switched network 236 understand, such as a SIP invite message. Similarly, communications from the dual mode telephone 106 when the telephone 106 is within range of the wireless access point 512 or from the VoIP phone 304A to either the telephone 308A serviced by the PSTN 116 or the wireless device 108 serviced by the licensed wireless network 112 are directed from the CSCF 914 to the MGCF 918 and then to the MGW 246 to convert the communications to a format that the PSTN 116 and the licensed wireless network 112 understand.

Referring back to FIG. 9, the dual mode telephone 106 functions as a GSM/GPRS handset operating over the licensed wireless network 112 the user is outside the range of a wireless access point. When the dual mode telephone 106 is moved inside a building that is equipped with a wireless access point 512 such as, for example, a 802.11b wireless access point or other wireless access, such as Bluetooth®, the dual mode telephone 106 functions as a cordless handset operating over the unlicensed wireless network 110 in conjunction with VoIP digital voice technology as described above. Wireless access points in buildings are connected to the telecommunications service provider's broadband packet data network. When a user is inside a residence or other WAP equipped facility, an exemplary implementation is for the wireless access point to be integrated into a BRG as described above. As described above, the dual mode telephone 106 may be equipped with a SIM card that will be used to identify the user and the user's service Provider. The user will be able to use the dual mode telephone 106 to "roam" within a service provider's network and to "roam" into other service providers' wireless access and wired access networks. That is, a user may operate the dual mode telephone 106 via any wireless access point of her service provider or via wireless access points of other service providers.

The voice and data functionality of the dual mode telephone 106, including the SIP software and SIM card, may be available to users in the form of a plug-in card that users can install in their laptop computers 107 or in Personal Data Assistants (PDAs). When equipped with the plug-in card, users will be able to use their laptop computer 107 or PDA, when equipped with an earpiece and microphone, to access the same voice and data services that they can access with a dual mode telephone 107.

When the dual mode telephone 106 is operating in the cordless wired access mode in conjunction with the wireless access point 512, digital voice calls are placed and received using the SIP software contained in the telephone. Data services, such as directories and messaging services, may execute on applications servers 912 in a service provider's broadband packet data service network 236 as described above in reference to FIG. 9.

When the dual mode handset is operating in the wireless (mobile) mode via the licensed wireless network 112, it may operate as a GSM/GPRS telephone. GSM protocols may be used to place and receive voice calls. GPRS protocols may be used to access the same data services that are accessible when the dual mode telephone 106 is operating in the cordless wired access mode.

According to embodiments of the invention, when a user is engaged in a call using their dual mode telephone 106 outside the range of a wireless access point 512 and enters a building with a wireless access point 512, the call may be automatically changed from the wireless (mobile) mode communicating over the licensed wireless network 112 to the digital cordless mode communicating over the unlicensed wireless network 110. When a user is engaged in a call using their dual mode telephone 106 inside a building with a wireless access point 512 and goes outside the building and the range of the wireless access point 512, the call may be automatically changed from the digital cordless mode communicating over the unlicensed wireless network 110 to the wireless (mobile mode) mode communication over the licensed wireless network 112.

Figure 7A:
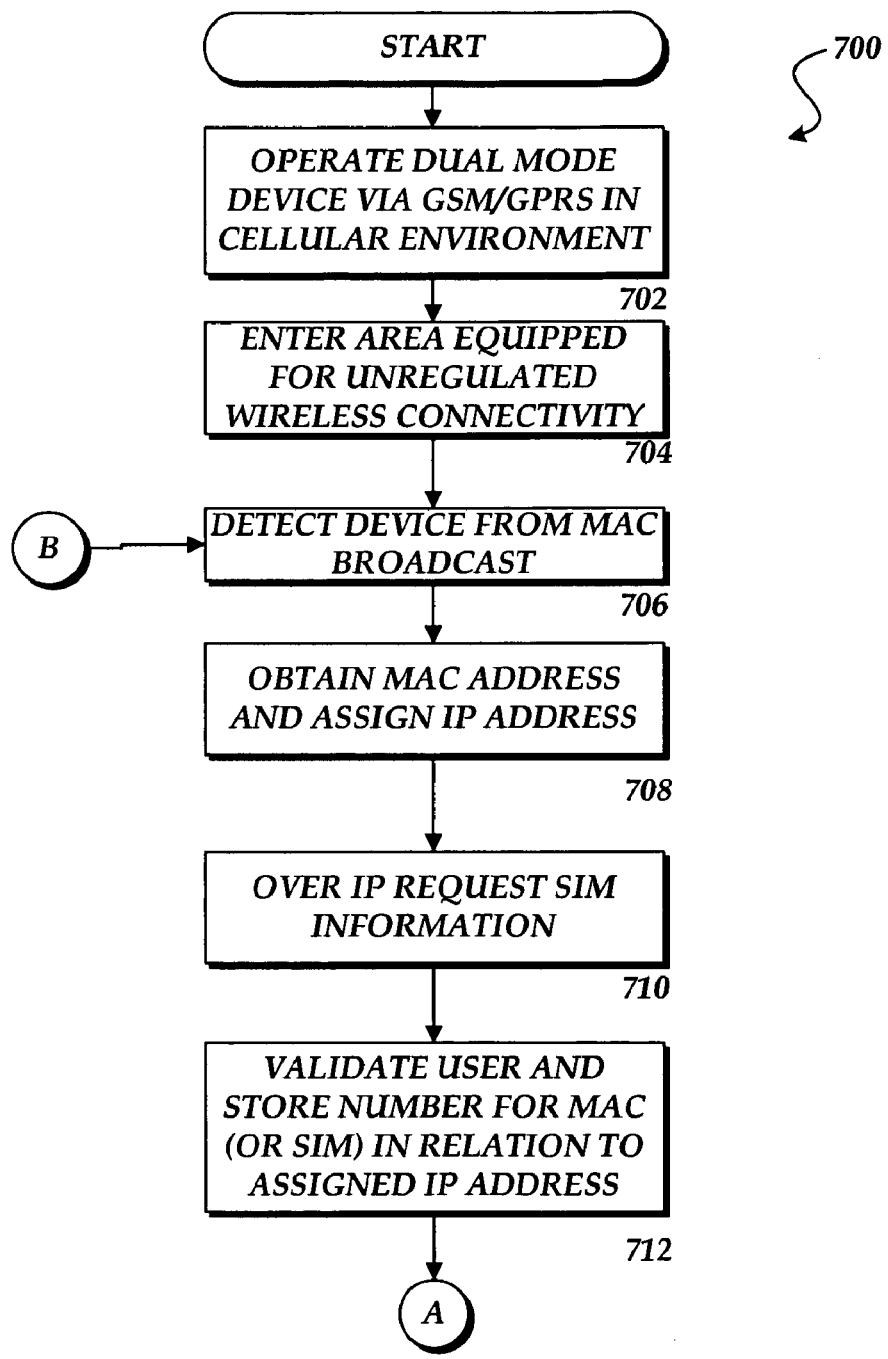
FIGS. 7A and 7B are flow diagrams illustrating a method for operating a dual mode telecommunications device according to embodiments of the present invention.

Having described a system architecture and operating environment for the dual mode telephone 106 described above with reference to FIG. 9, FIGS. 7A and 7B are flow diagrams illustrating an example operation of the dual mode telephone 106 according to embodiments of the present of invention. The method of accessing voice and data services via the dual mode telephone 106 described below is by way of example only and is not restrictive of other methods for accessing voice and data services via the dual mode telephone 106. The operation 700 begins at block 702 where a user operates the dual mode telephone 106 device via the licensed wireless network 112 and engages in an in-progress telephone call. As should be appreciated, the telephone call may be operated through any suitable licensed wireless network 112 including a global system for mobile communications (GSM)/general packet radio service (GPRS) wireless communications environment. At block 704, the user engaged in an in-progress telephone, as described above, enters an area equipped for unlicensed wireless connectivity. As described above, the user may have entered into her home, a business, a school, a leisure activity center, and the like that has been equipped with a wireless access point 512 for allowing communications over an unlicensed wireless network 110 through a wire data network via VoIP communication. According to an embodiment of the present invention, the dual mode telephone 106 contains hard-wired or software instructions sufficient to detect the availability of the alternate connectivity source in the form of the unlicensed wireless network 110 via the wireless access points. That is, signaling detected by the telephone 106 from the unlicensed wireless network 110 allows the telephone 106 to know that the unlicensed wireless network 110 is available for use by the telephone 106.

At block 706, the wireless access point 512 detects the dual mode telephone 106 entering the unlicensed wireless network 110 from the MAC broadcast by the telephone 106. At block 708, the MAC address is obtained from the broadcast and an IP address is assigned to the dual mode telephone 106 having the MAC address. Depending upon the connectivity of the wireless access point 512 to the wired data network, the IP address may be assigned at a local router or may be assigned at a remote router of the wired data network.

Once the IP address is assigned such that IP packets may be exchanged with the dual mode telephone 106, then the packet switched network 236 requests the unique subscriber identity information from the dual mode telephone 106 over the IP connection at block 710. At block 712, a look-up of the unique subscriber identity information is performed in a network database such as the HSS 912. A determination is made about whether the user identified by the unique subscriber identity information is a valid user based on the look-up in the database. The unique subscriber identity information may not be located which indicates the user is not a subscriber and should not be given access to the network. If the user is not validated, as described, the connection with the dual mode telephone 106 is terminated at block 712 and the operations end.

Alternatively, the unique subscriber identity information may be found by the look-up. The unique subscriber identity information may correspond to a subscriber of the current service provider as noted by the unique subscriber identity or may correspond to a subscriber of other service providers as indicated by the unique subscriber identity who is a guest user for the current service provider. Once a valid user has been found based on the look-up, the telephone number found from the look-up that is known for the MAC or unique subscriber identity information identifying the dual mode telephone 106 is stored in relation to the assigned IP address.

Figure 7B:
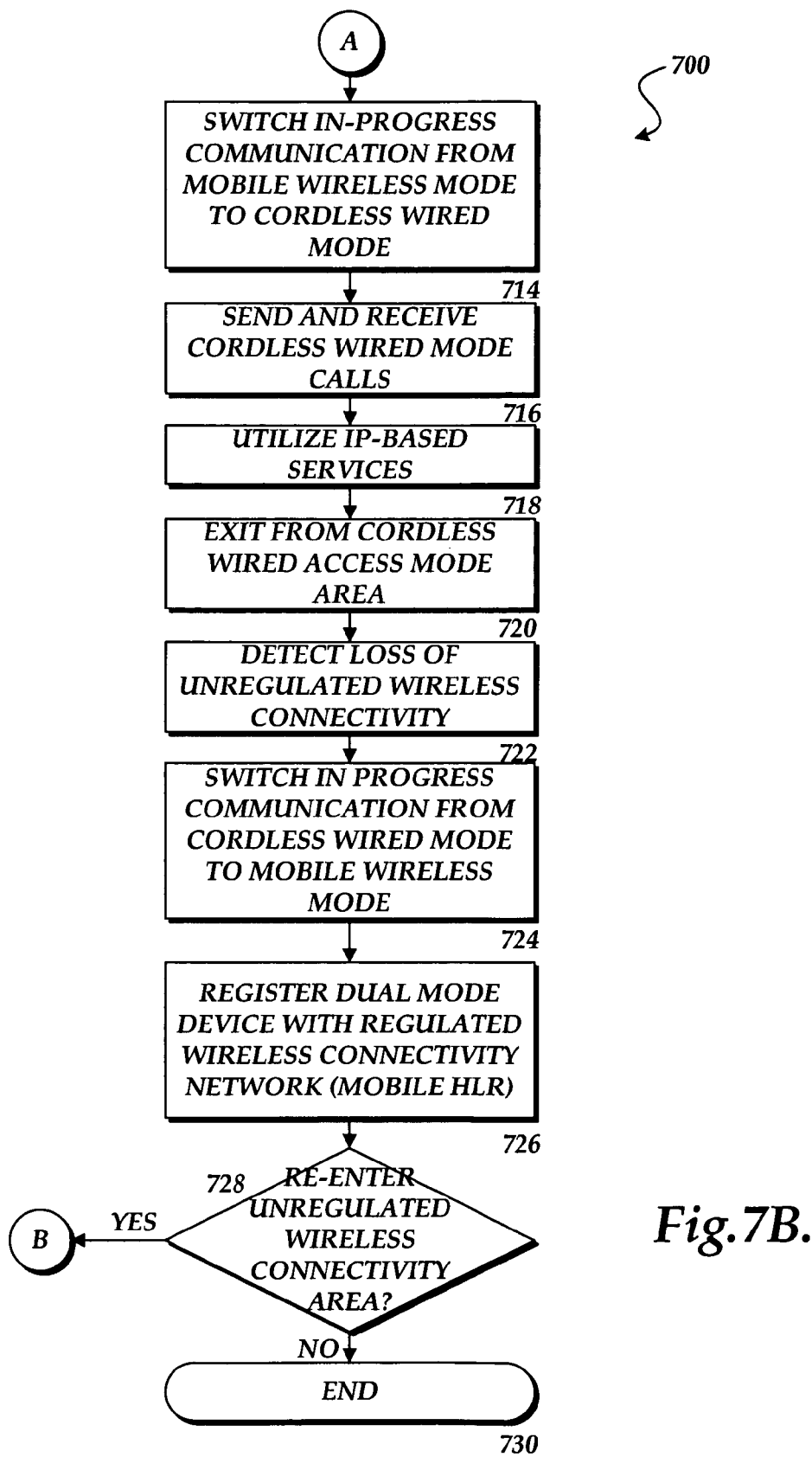

At block 714, FIG. 7B, the in-progress call automatically switches from the mobile wireless mode via the licensed wireless network 112 to the cordless mode through the wireless access point 512 into the unlicensed wireless network 110 for VoIP communications through the wired data network 114. At block 716, the user may now complete the in-progress call and send and receive subsequent calls on the dual mode telephone 106 via the cordless mode through the unlicensed wireless network 110. Advantageously, if the building in which the user is operating receives poor transmission quality to and from the licensed wireless network 112, the user receives a better calling experience once the dual mode telephone 106 is transitioned from the mobile wireless mode to the cordless mode, as described below.

At block 718, the user may now utilize a wide range of Internet protocol-based services owing to the availability of data services available through the transmission over an Internet protocol through the unlicensed wireless network 110. For example, as described above, the user may utilize web-based user administration for administering the user's call services. The user may obtain and utilize a variety on-line services such as on-line telephone directories and personalized voice mail. The user may also utilize other electronic devices besides the dual mode telephone 106, such as the computer 107, which is illustrative of a laptop computer, a desktop computer, a personal digital assistant, or other computing device where the user may obtain digital services via the unlicensed wireless network 110, or the user may obtain VoIP voice services by equipping the computing device 107 with an earpiece and microphone to access the same voice and data services that the user may access the dual mode telephone 106.

At block 720, according to an embodiment of the present invention, the user exits from the unlicensed wireless network 110 whereby the user removes the dual mode telephone 106 from the range of the wireless access point 512 allowing access to the unlicensed wireless network 110. For example, the user may exit from her home, a business, or other structure having wireless access points for communications with the unlicensed wireless network 110. At block 722, the dual mode telephone 106 detects the loss of the unlicensed wireless network connectivity. At block 724, the dual mode telephone 106 detects the availability of connectivity through the licensed wireless network 112. Accordingly, any in-progress communications by the user through the cordless mode via the unlicensed wireless network 110 are switched automatically to a mobile wireless mode via the licensed wireless network 112.

At block 726, the dual mode telephone 106 is registered with the licensed wireless network 112 by registering its presence in the network via the HSS 912 through the MSC 272 of the licensed wireless network 112. At block 728, a determination is made as to whether the dual mode telephone 106 reenters the operating range of the unlicensed wireless network 110 such as the case where the telephone 106 is carried by a user into a home, public or other private structure having wireless access points for communication between the dual mode telephone 106 and the wired data network via the unlicensed wireless network 110. If not, the method ends at block 730. If the telephone 106 has re-entered the operating area of the unlicensed wireless network 110, operation proceeds back to block 706 for connectivity of the dual mode telephone 106 via the unlicensed wireless network 110, as described above.

According to another embodiment of the invention, each dual mode telephone 106 is associated with a wireless number for communication via the licensed wireless network 112 and a wired data line number for communication via the unlicensed wireless network 110. Although the dual mode phone 106 is associated with a wireless number for incoming and outgoing communications via the licensed wireless network 112 and a wired data line number for incoming and outgoing communications via the unlicensed wireless network 110, the dual mode phone appears to be associated with only the wireless number, also known as the personal number of the dual mode telephone 106, because communications directed to or from the wireless number while the phone 106 is within an area equipped for unlicensed wireless connectivity are forwarded to the wired data line number associated with the phone 106 for communication via the unlicensed wireless network 110, as explained below with regard to FIGS. 8A-8C.

Figure 8A:
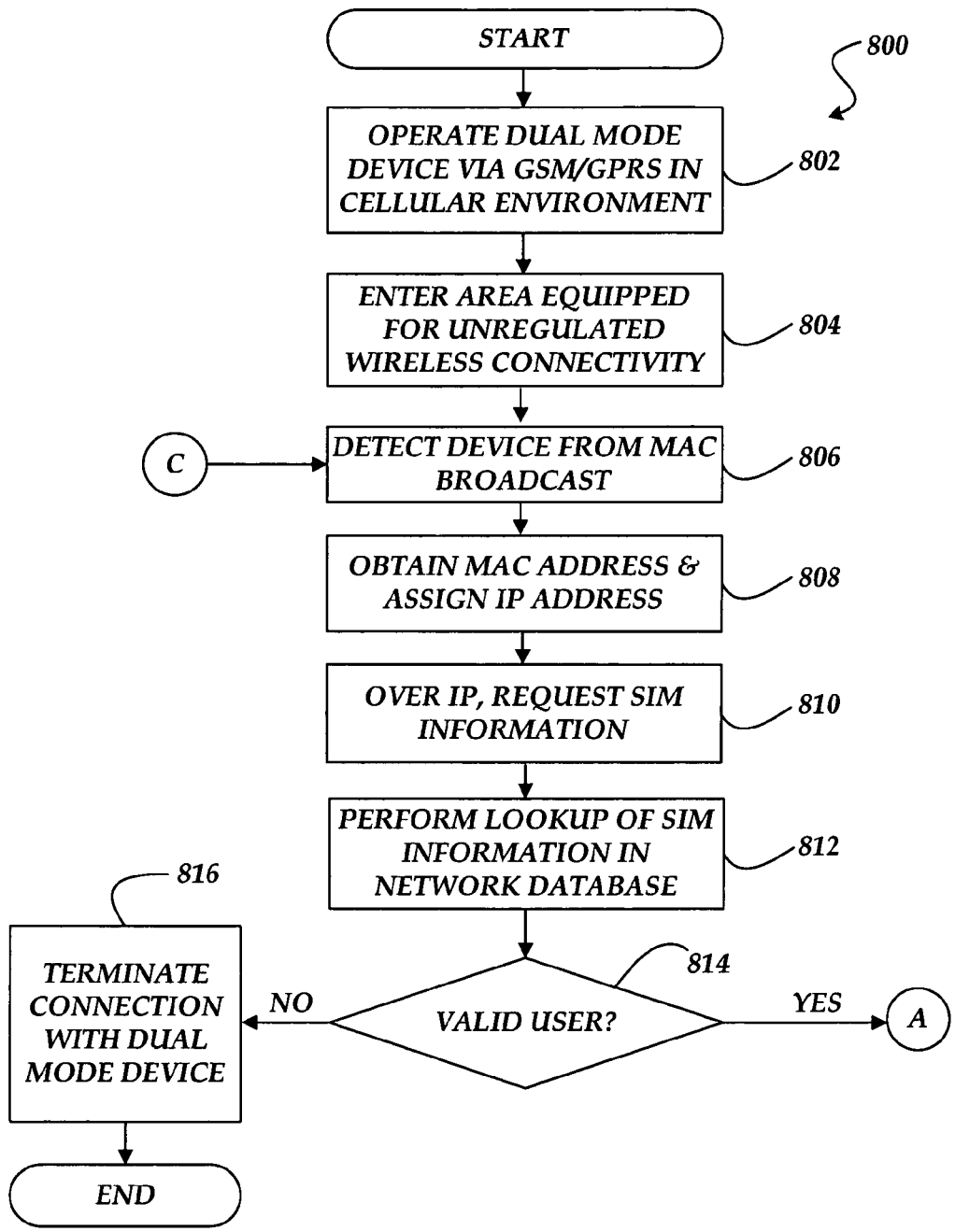
FIGS. 8A, 8B, and 8C are flow diagrams illustrating an alternative method for operating a dual mode telecommunications device according to embodiments of the present invention.
Figure 8B:
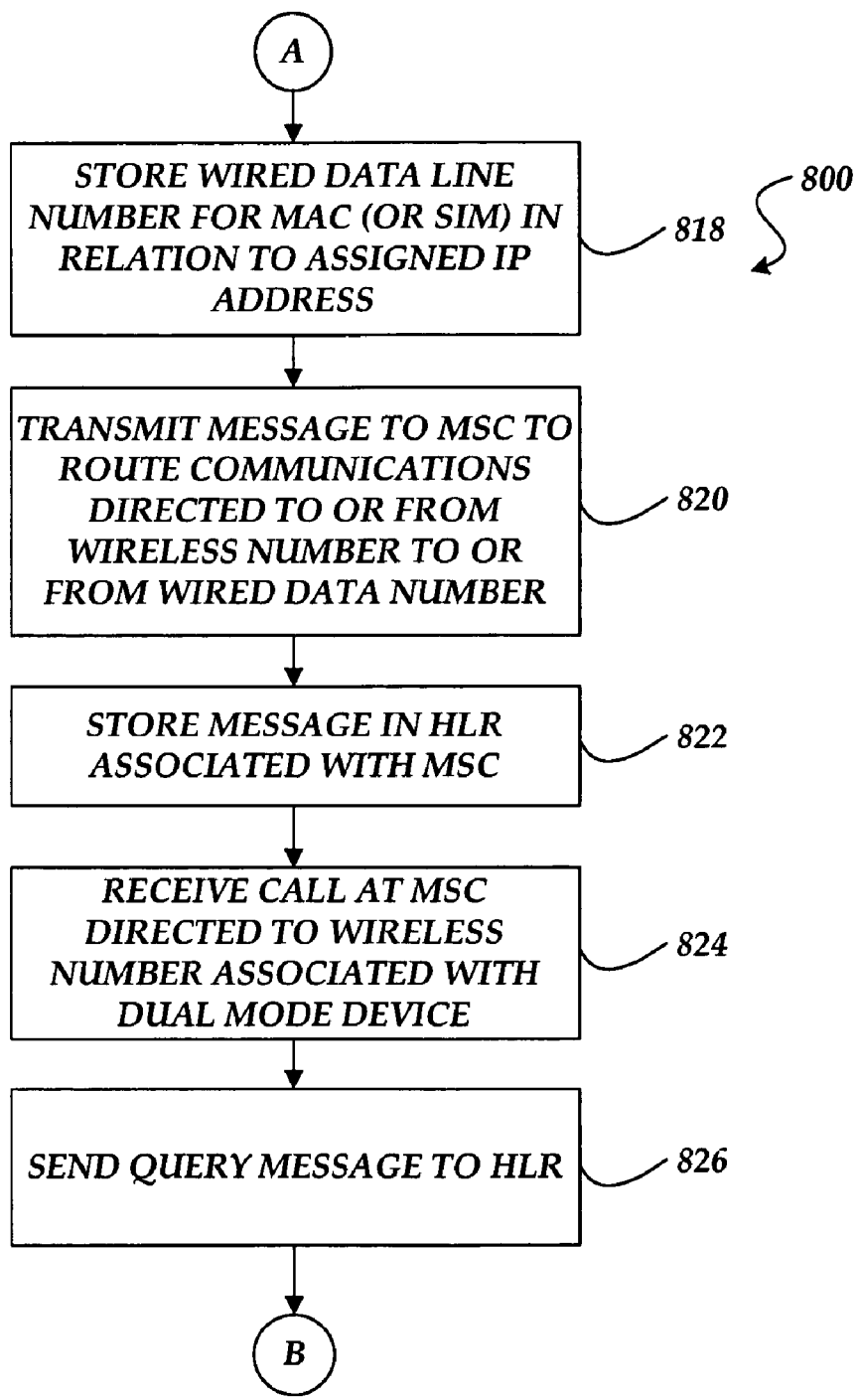
Figure 8C:
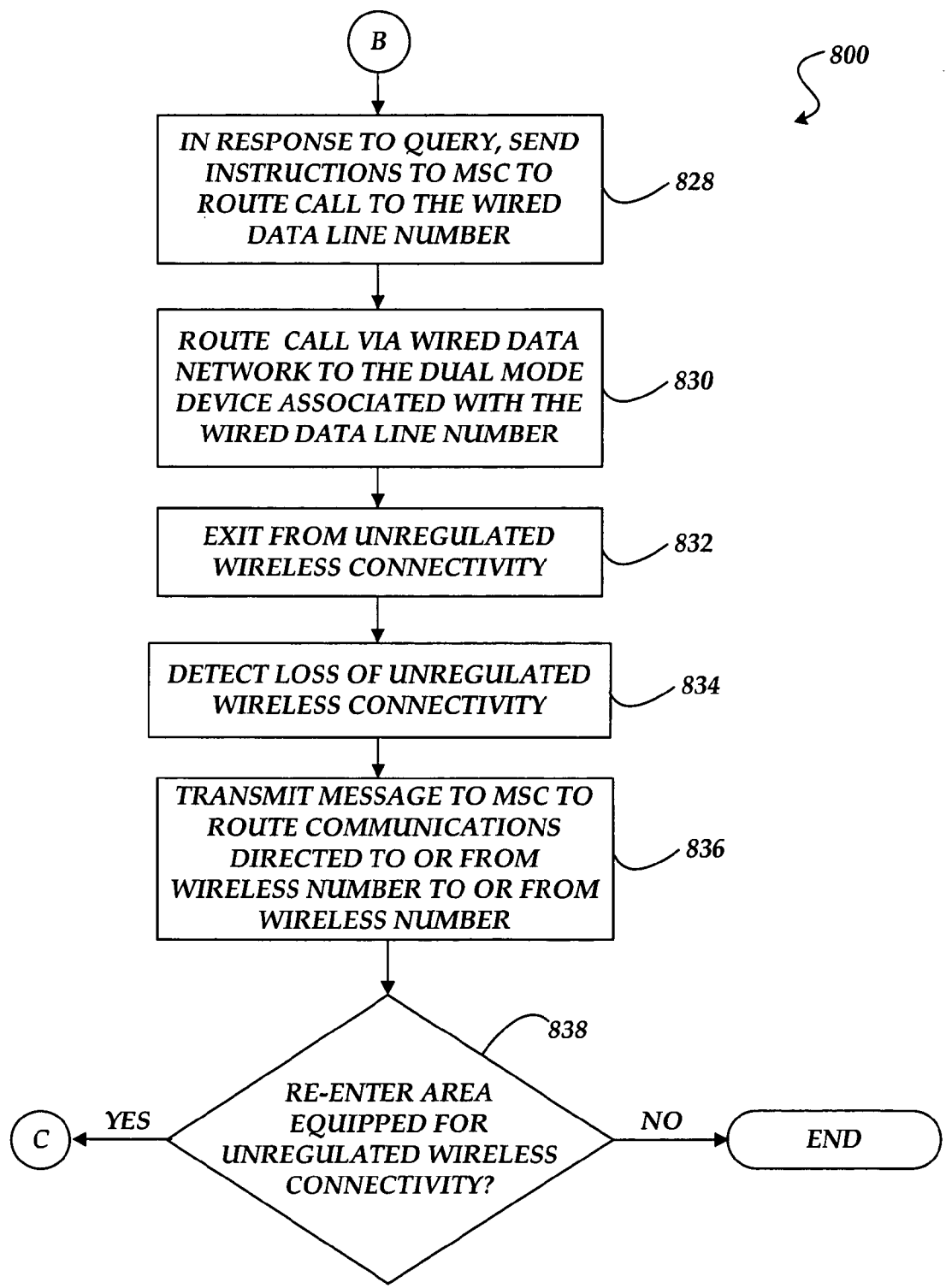

FIGS. 8A-8C are flow diagrams illustrating an example operation of the dual mode telephone 106 according to the embodiment of the present of invention described above. The method of accessing voice and data services via the dual mode telephone 106 described below is by way of example only and is not restrictive of other methods for voice and data services via the dual mode telephone 106. The operation 800 begins at block 802 where the dual mode telephone 106 device operates via the licensed wireless network 112 to provide incoming and outgoing calls through the licensed wireless network. As should be appreciated, the telephone call may be operated through any suitable licensed wireless network 112 including a global system for mobile communications (GSM)/general packet radio service (GPRS) wireless communications environment. At block 804, the dual mode telephone 106, as described above, is brought into an area equipped for unlicensed wireless connectivity. As described above, a user of the dual mode telephone 106 may have entered into her home, a business, a school, a leisure activity center, and the like that has been equipped with wireless access points for allowing communications over an unlicensed wireless network 110 through a wire data network via voice over Internet protocol communication. According to an embodiment of the present invention, the dual mode telephone 106 contains hard-wired or software instructions sufficient to detect the availability of the alternate connectivity source in the form of the unlicensed wireless network 110 via the wireless access points. That is, signaling detected by the telephone 106 from the unlicensed wireless network 110 allows the telephone to know that the unlicensed wireless network 112 is available for use by the telephone.

At block 806, the wireless access point 512 detects the dual mode telephone 106 entering the wireless network from the MAC broadcast by the dual mode telephone 106. At block 808, the MAC address is obtained from the broadcast and an IP address is assigned to the handset having the MAC address. Depending upon the connectivity of the wireless access point to the wired data network, the IP address may be assigned at a local router or may be assigned at a remote router of the wired data network.

Once the IP address is assigned such that IP packets may be exchanged with the dual mode telephone 106, then the unlicensed wireless network 112 requests the unique subscriber identity information from the telephone over the IP connection at block 810. At block 812, a look-up of the unique subscriber identity information is performed in the HSS 912, as illustrated in FIG. 9. A determination is made about whether the user identified by the unique subscriber identity information is a valid user based on the look-up in the database at block 814. The unique subscriber identity information may not be located which indicates the user is not a subscriber and should not be given access to the network. If the user is not validated, as described, the connection with the dual mode telephone 106 is terminated at block 816 and the operations end.

Alternatively, the unique subscriber identity information may be found by the look-up. The unique subscriber identity information may correspond to a subscriber of the current service provider as noted by the unique subscriber identity, or may correspond to a subscriber of other service providers as indicated by the unique subscriber identity who is a guest user for the current service provider. Once a valid user has been found based on the look-up, the wired data line number found from the look-up that is known for the MAC or unique subscriber identity information identifying the dual mode telephone 106 is stored in relation to the assigned IP address at block 818, FIG. 8B.

At block 820, the dual mode telephone 106 sends a first message such as, for example, a short message service (SMS) message to the MSC 272 of the licensed wireless network 112 notifying the MSC 272 to route communications directed to the wireless number associated with the dual mode phone 106 to the wired data line number associated with the phone 106. Alternatively, the BRG 206 or wireless access point 512 may send the message to the MSC 272 via the MGW 246. At block 822, the MSC 272 routes the message to the HSS 912 where the message is stored. At block 824, when a communication directed to the wireless number associated with the dual mode phone 106 is received at the MSC 272, a termination attempt trigger is generated at the MSC. In response thereto, a query is transmitted to the HSS 912 requesting further instructions on the handling of the incoming communication at block 826. Based on the content of the first message stored at the HSS 912, at block 828 the incoming communication is routed to the wired data line number associated with the dual mode phone 106 via the unlicensed wireless network 110 for VoIP communication, such as through the GMSC 250 and MGW 246 from the MSC 272. A look-up is performed within the unlicensed wireless network 110 to determine the IP address that is associated with the wired data line number of the dual mode telephone 106. Upon determining the proper IP address, a VoIP ring to the dual mode phone 106 having the IP address is performed via a VoIP session to alert the user of the dual mode phone 106 that there is an incoming call. The user may send and receive subsequent calls on the dual mode telephone 106 via the cordless mode through the unlicensed wireless network 110. Advantageously, if the building in which the user is operating receives poor transmission quality to and from the licensed wireless network 112, the user receives a better calling experience once the dual mode telephone 106 is transitioned from the mobile wireless mode to the cordless mode, as described above.

At block 832, according to an embodiment of the present invention, the user exits from the unlicensed wireless network 110 whereby the user removes the dual mode telephone 106 from the range of a wireless access point 512 allowing access to the unlicensed wireless network 110. For example, the user may exit from her home, a business, or other structure having wireless access points for communications with the unlicensed wireless network 110. At block 834, the dual mode telephone 106 detects the loss of the unlicensed wireless network connectivity. Accordingly, the dual mode phone 106 sends a second message to the MSC 272 of the licensed wireless network 112 notifying the MSC 272 to route communications directed to the wireless number associated with the dual mode phone 106 to the wireless number at block 836. The BRG 206 or wireless access point 512 may alternatively send the message to the MSC 272 via the media gateway 246 based on the detection of the loss of connectivity with the unlicensed wireless network 110. The MSC 272 routes the message to the HSS 912 where the message is stored. When a communication directed to the wireless number associated with the dual mode phone 106 is received at the MSC 272, a termination attempt trigger is generated at the MSC 272. In response thereto, a query is transmitted to the HSS 912 requesting further instructions on the handling of the incoming communication. Based on the content of the second message stored at the HSS 912, the incoming communication is routed to the wireless number associated with the dual mode phone 106 via the licensed wireless network 112 for wireless (mobile) communication.

At block 838, a determination is made as to whether the dual mode telephone 106 reenters the operating range of the unlicensed wireless network 110 such as the case where the telephone 106 is carried by a user into a home, public or other private structure having wireless access points for communication between the dual mode telephone and the wired data network via the unlicensed wireless network 110. If not, incoming and outgoing communications continue to be routed via the licensed wireless network 112. If the telephone 106 has re-entered the operating area of the unlicensed wireless network 110, operation proceeds back to block 806 for connectivity of the dual mode telephone 106 via the unlicensed wireless network 110, as described above.

During use, the dual mode handset 104 may move from an area serviced by the licensed wireless network 112 to an area equipped for unlicensed wireless connectivity. In one embodiment of the invention, if a user is engaged in a telephone call on the dual mode handset 106 via the licensed wireless network 112 when the user enters an area equipped for unlicensed wireless connectivity, then the first message notifying the MSC 272 to route communications directed to the wireless number associated with the dual mode telephone 106 to the wired data line number associated with the telephone 106 for communication over the unlicensed wireless network 110 is delayed until the telephone call is terminated. In an alternate embodiment, when the user enters an area equipped for unlicensed wireless connectivity while engaged in a telephone call on the dual mode telephone 106 via the licensed wireless network 112, the telephone call is transferred to the unlicensed wireless network 110 when the MAC address is obtained from the broadcast by the dual mode handset 106.

As discussed above, although the dual mode telephone 106 is associated with a wireless (personal) number 920 and a wired data line number, the dual mode telephone 106 only appears to be associated with the wireless (personal) number 920 because communications directed to or from the wireless number 920 while the phone 106 is within an area equipped for unlicensed wireless connectivity are forwarded to the wired data line number associated with the phone 106 for communication via the unlicensed wireless network 110, as explained above with regard to FIGS. 8A-8C. In an embodiment of the present invention, the wireless (personal) number 920 of the dual mode telephone 106 may be associated with the directory (family) number of the VoIP family phones 304A, 304B such that when a call directed to the personal number 920 of the dual mode telephone 106 is received and the dual mode telephone 106 is within range of the wireless access point 512 of the home 204, the dual mode telephone 106 as well as the VoIP family phones 304A, 304B will ring to indicate an incoming communication, as explained below with regard to FIGS. 10A-10B. Therefore, when the dual mode telephone 106 is located within the home 204, a communication directed to the dual mode telephone 106 may be answered on the telephone 106 or on either of the VoIP phones 304A, 304B. In a preferred embodiment, the dual mode telephone 106 and the VoIP family phones 304A, 304B are rung with a distinctive ring tone associated with the dual mode telephone 106 or a call announcement associated with the dual mode telephone 106 is provided so that members in the home 204 know that the communication is directed to the owner of the dual mode telephone 106. The distinctive ring tone or call announcement associated with the dual mode telephone 106 may be set forth by accessing the application servers 916 through a web interface provided to a personal computer.

Figure 10A:
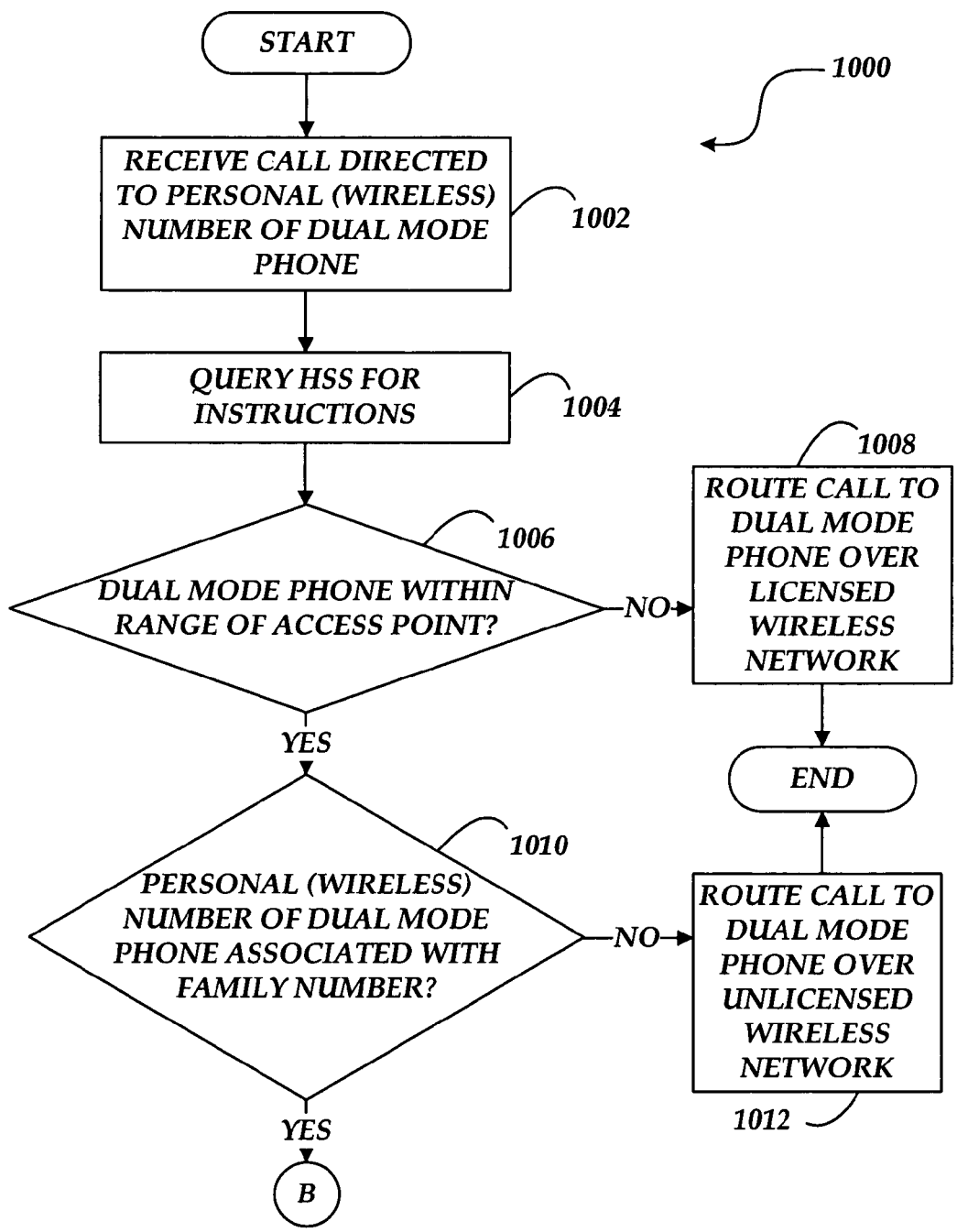
FIGS. 10A and 10B are flow diagrams illustrating a method for routing calls directed to a dual mode device.
Figure 10B:
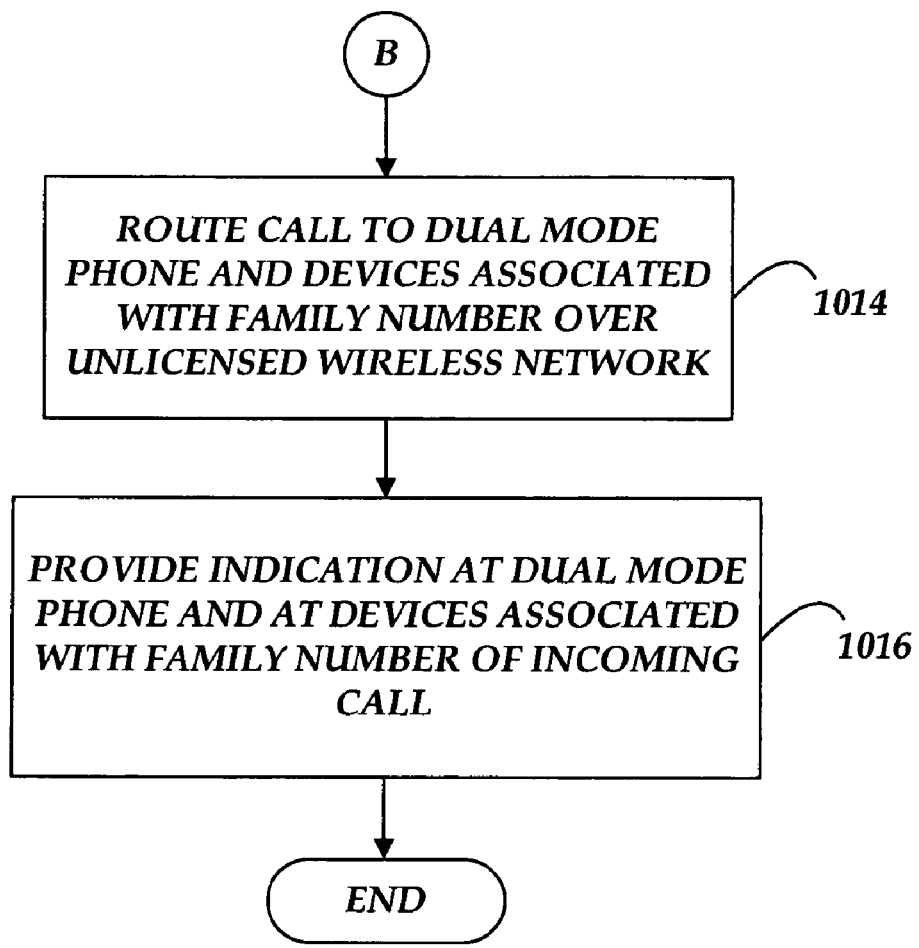

FIGS. 10A-10B are flow diagrams illustrating a method for providing indication at the dual mode telephone 106 and at VoIP family phones 304A, 304B of an incoming communication directed to the dual mode telephone 106. The process 1000 starts at block 1002, where the MSC 272 receives a communication directed to the personal (wireless) number 920 associated with the dual mode telephone 106. Upon receipt of the communication, a termination attempt trigger is generated at the MSC 272. In response thereto, a query is transmitted to the HSS 912 requesting further instructions on the handling of the incoming communication at block 1004. The process 1000 proceeds from block 1004 to block 1006 where a determination is made whether the dual mode telephone 106 is within the range of the wireless access point 512 of the home 204. As described above with regards the FIGS. 8A-8C, when the dual mode device 106 is brought within range of the wireless access point 512, the dual mode telephone 106 sends a first message such as, for example, a SMS message to the MSC 272 of the licensed wireless network 112 notifying the MSC 272 to route communications directed to the wireless (personal) number associated with the dual mode phone 106 to the wired data line number associated with the phone 106. The MSC 272 stores the message in the HSS 912. If such a message has been stored in the HSS 912, then the process proceeds from block 1006 to block 1010. In an alternative embodiment, a determination whether the dual mode telephone 106 is within the range of the wireless access point 512 may be made based on the location information associated with the dual mode telephone 106 stored in the HSS 912.

If, on the other hand, a determination is made that the dual mode phone 106 is not within the range of the wireless access point 512, then the process 1000 proceeds to block 1008, where the communication is routed to the personal (wireless) number 920 of the dual mode telephone 106 over the licensed wireless network 112. Therefore, when the dual mode telephone 106 is outside of the home 204, calls directed to the personal number of the dual mode phone 106 only ring the dual mode phone 106.

At block 1010, a determination is made whether the personal (wireless) number 920 of the dual mode telephone 106 is associated with the family (directory) number associated with the VoIP phones 304A, 304B. The HSS 912 may include a look-up table of all of the directory numbers associated with the personal number of the dual mode telephone 106. If the personal (wireless) number 920 of the dual mode telephone 106 is not associated with the family number of the VoIP phones 304A, 304B, then the process 1000 proceeds to block 1012, where the communication is routed to the wired data line number associated with the dual mode telephone 106 over the unlicensed wireless network 110. If, on the other hand, a determination is made that the personal number 920 of the dual mode telephone 106 is associated with the family number of the VoIP phones 304A, 304B, then the process 1000 proceeds to block 1014, where the communication is routed to the wired data line number associated with the dual mode telephone 106 and the family number associated with the VoIP phones 304A, 304B over the unlicensed wireless network 110. An indication of the incoming communication is provided at the dual mode telephone 106 and at the VoIP phones 304A, 304B at block 1016. In an embodiment of the present invention, the indication includes a distinctive ring tone or a call announcement associated with the dual mode telephone 106 so that members of the home 204 know that the communication is directed to the owner of the dual mode telephone 106.

Figure 11A:
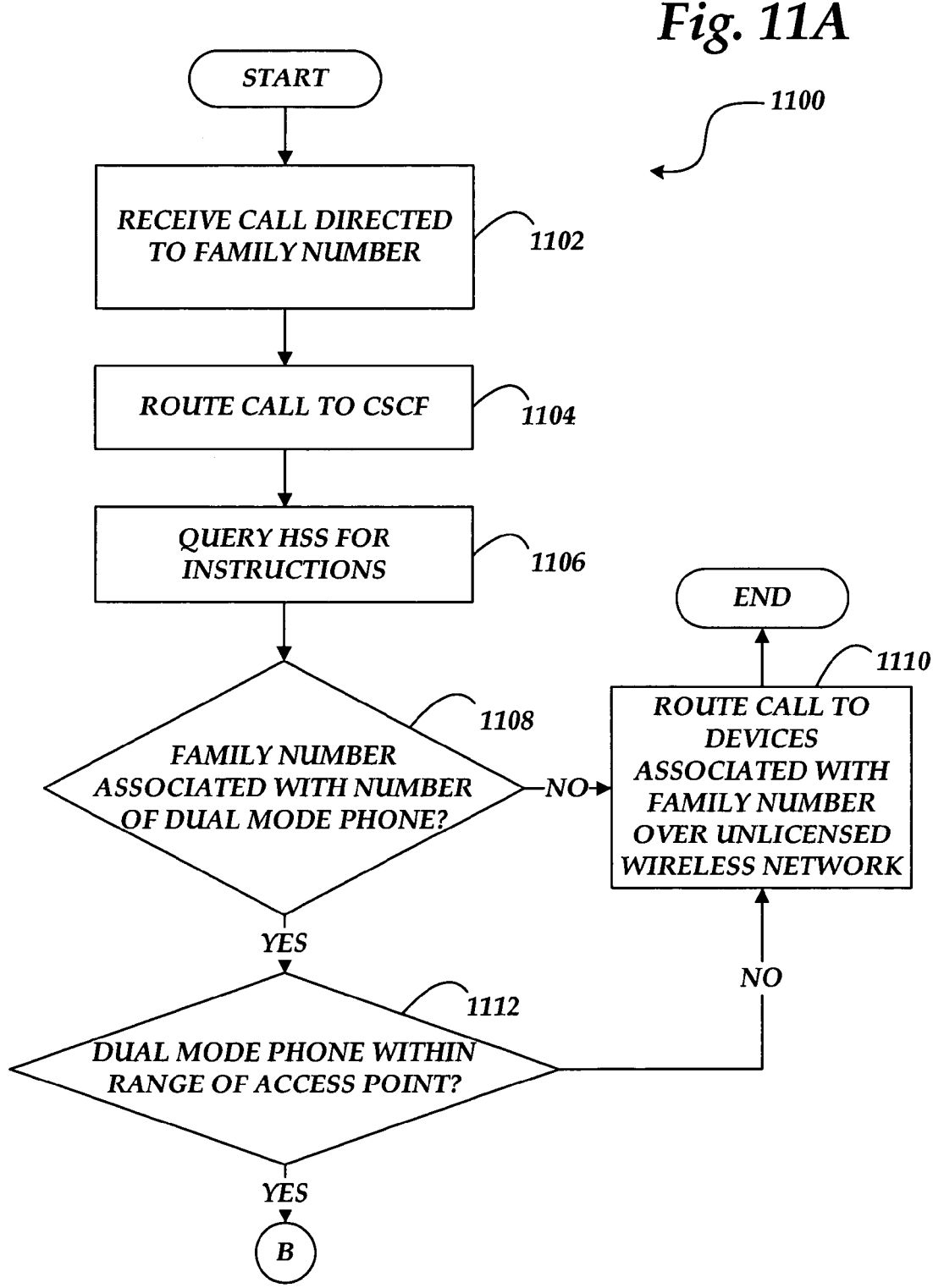
FIGS. 11A and 11B are flow diagrams illustrating a method for routing call directed to VoIP phones.
Figure 11B:
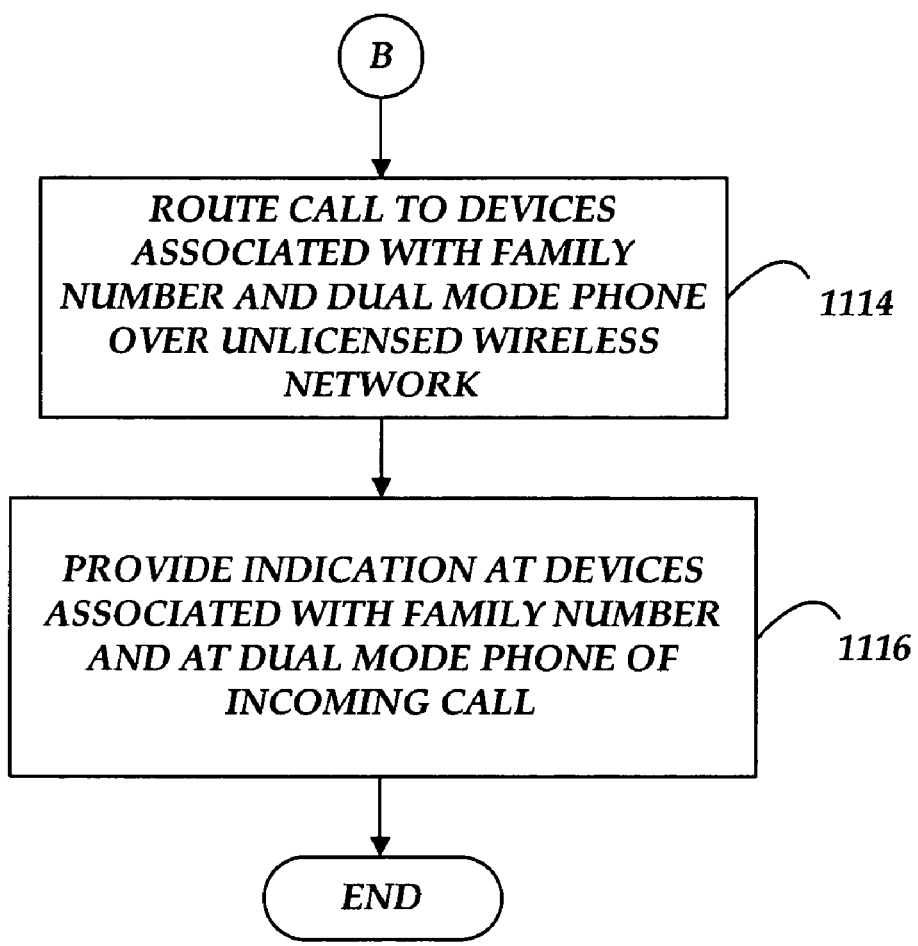

In another embodiment of the present invention, the directory (family) number of the VoIP family phones 304A, 304B may be associated with the wireless (personal) number 920 of the dual mode telephone 106 such that when a call directed to the family number of the VoIP phones 304A, 304B is received and the dual mode telephone 106 is within range of the wireless access point 512 of the home 204, the VoIP family phones 304A, 304B as well as the dual mode telephone 106 will ring to indicate an incoming communication, as explained below with regard to FIGS. 11A-11B. Therefore, when the dual mode telephone 106 is located within the home 204, a communication directed to the VoIP phones 304A, 304B may be answered on the VoIP phones 304A, 304B as well as the dual mode telephone 106. In a preferred embodiment, the VoIP family phones 304A, 304B and the dual mode telephone 106 are rung with a distinctive ring tone associated with the VoIP phones 304A, 304B or a call announcement associated with the VoIP phones 304A, 304B is provided so that members in the home 204 know that the communication is directed to the family. The distinctive ring tone or call announcement associated with the VoIP phones 304A, 304B may be set forth by accessing the application servers 916 through a web interface provided to a personal computer.

FIGS. 11A-11B are flow diagrams illustrating a process 1100 for providing indication at VoIP family phones 304A, 304B and at the dual mode telephone 106 of an incoming communication directed to the VoIP family phones 304A, 304B. The process 1100 starts at block 1102, where a communication directed to the family number of the VoIP phones 304A, 304B is received. If the communication is from one of the phones 308A, 308B serviced by the PSTN 116, then the communication is received by the CO 245. If the communication is from the wireless (mobile) phone 108 serviced by the licensed wireless network 112, then the communication is received by the MSC 272. The communication is forwarded to the CSCF 914 at block 1104 through the MGW 246 from either the CO 245 or the MSC 272 depending on the network that services the phone from which the communication originates. From block 1104, the process 1100 proceeds to block 1106, where the CSCF 914 queries the HSS 912 for further instructions on handling the incoming communication.

From block 1106, the process 1100 proceeds to block 1108, where a determination is made whether the family number of the VoIP phones 304A, 304B is associated with the wired data line number of the dual mode telephone 106. The HSS 912 may include a look-up table of all of the directory numbers associated with the family number of the VoIP phones 304A, 304B. If the family number of the VoIP phones 304A, 304B is not associated with the wired data line number of the dual mode telephone 106, then the process 1100 proceeds to block 1110, where the communication is routed to the family number associated with the VoIP phones 304A, 304B over the unlicensed wireless network 110. If, on the other hand, a determination is made that the family number of the VoIP phones 304A, 304B is associated with the wired data line number of the dual mode telephone 106, then the process 1100 proceeds to block 1112.

At block 1112, a determination is made whether the dual mode telephone 106 is within the range of the wireless access point 512 of the home 204. As described above with regards the FIGS. 8A-8C, when the dual mode device 106 is brought within range of the wireless access point 512, the dual mode telephone 106 sends a first message such as, for example, a SMS message to the MSC 272 of the licensed wireless network 112 notifying the MSC 272 to route communications directed to the wireless number associated with the dual mode phone 106 to the wired data line number associated with the phone 106. The MSC 272 stores the message in the HSS 912. If such a message has been stored in the HSS 912, then the process 1100 proceeds from block 1112 to block 1114. In an alternative embodiment, a determination whether the dual mode telephone 106 is within the range of the wireless access point 512 may be made based on the location information associated with the dual mode telephone 106 stored in the HSS 912. If, on the other hand, a determination is made that the dual mode phone 106 is not within the range of the wireless access point 512, then the process 1100 proceeds back to block 1110, where the communication is routed to the family number of the VoIP phones 304A, 304B over the unlicensed wireless network 110. Therefore, when the dual mode phone 106 is outside of the home 204, communications directed to the family number of the VoIP phones 304A, 304B ring only the VoIP phones 304A, 304B.

At block 1114, the communication is routed to the family number associated with the VoIP phones 304A, 304B and to the wired data line number associated with the dual mode telephone 106 over the unlicensed wireless network 110. An indication of the incoming communication is provided at the VoIP phones 304A, 304B and at the dual mode telephone 106 at block 1116. In an embodiment of the present invention, the indication includes a distinctive ring tone or call announcement associated with the VoIP phones 304A, 304B so that members of the home 204 know that the communication is directed to the family number.

As described herein, methods and systems are provided for utilizing a dual mode telephone for operation via a licensed wireless network and for operation via an unlicensed wireless network. It will be apparent to those skilled in the art that various modifications or variations may be made in the present invention without departing from the scope or spirit of the invention. Other embodiments of the invention will be apparent to those skilled in the art from consideration of the specification and practice of the invention disclosed herein.

What is claimed is:

1. A method, comprising:
   receiving a communication from a calling party, the communication is directed to an address assigned to a first wireless communication device configured to connect to a cellular network, and a second wireless communication device configured to connect to a non-cellular wireless network;
   placing a first outgoing call to the first wireless communication device via the cellular network; and
   placing a second outgoing call, substantially simultaneously to placing the first outgoing call, to the second wireless communication device via the non-cellular wireless cellular network.

2. The method of claim 1, further comprising, connecting the calling party to the first wireless communication device and dropping the second outgoing call, in response to the first outgoing call being answered prior to the second outgoing call.

3. The method of claim 1, further comprising, connecting the calling party to the second wireless communication device and dropping the first outgoing call, in response to the second outgoing call being answered prior to the first outgoing call.

4. The method of claim 1, further comprising, dropping the first outgoing call and the second outgoing call in response to the first outgoing call and the second outgoing call not being answered within a predetermined period of time.

5. The method of claim 1, further comprising, routing the communication to a softswitch for delivery of voicemail services, in response to the first outgoing call and the second outgoing call not being answered within a predetermined period of time.

6. The method of claim 1, wherein the placing the second outgoing call includes placing the second outgoing call over a voice over internet protocol network.

7. The method of claim 1, further comprising, determining whether the address is assigned to a dual mode device, which operates within the cellular network and the non-cellular network.

8. The method of claim 1, further comprising, providing a single bill for communication associated with the first wireless communication device and the second wireless communication device.

9. A system, comprising:
   a network data store that stores a telephone number shared by a first wireless communication device configured to connect to a cellular network, and a second wireless communication device configured to connect to a wired data network without employing cellular communication; and
   a service node that, substantially simultaneously, initiates outgoing telephone calls to the first wireless communication device, over the cellular network, and the second wireless communication device over the wired data network, in response to receiving communication directed to the telephone number.

10. The system of claim 9, wherein the wired data network is a voice over internet protocol network.

11. The system of claim 9, wherein the service node determines that one of the outgoing telephone calls is answered and drops, the remaining of the outgoing telephone calls.

12. The system of claim 9, wherein the service node provides an indication to determine which of the first wireless communication device and the second wireless communication device, the communication is directed to, in response to the communication being directed to a specific communication device.

13. The system of claim 12, wherein the indication includes a distinctive ring tone provided with the outgoing telephone calls.

14. The system of claim 9, wherein the telephone number is shared by a dual mode communication device that operates within the cellular network and the wired data network.

15. The system of claim 14, wherein the service node routes the communication over the wired data network to the dual mode communication device in response to the dual mode communication device being in range of a wireless access point associated with the wired data network.

16. The system of claim 15, wherein the service node routes the communication over the cellular network to the dual mode communication device in response to the dual mode communication device moving outside the range of the wireless access point, without an explicit indication from the dual mode communication device.

17. The system of claim 9, further comprising, a shared voice mailbox that is accessible from the first wireless communication device and the second wireless communication device.

18. A system, comprising:
    a first wireless communication device configured to connect to a cellular network; and
    a second wireless communication device, configured to connect to a non-cellular wireless network, that shares a telephone number with the first wireless communication device,
    wherein a first call is received at the first wireless communication device via the cellular network, substantially simultaneously to a second call received at the second wireless communication device, in response to a communication being directed to the telephone number.

19. The system of claim 18, further comprising, a dual mode device, configured to operate within the cellular network and the non-cellular network, that shares the telephone number with the first wireless communication device and the second wireless communication device.

20. The system of claim 18, wherein the second wireless communication device is configured to connect to a voice over internet protocol without employing cellular communication.

* * * * *